(12) United States Patent
Rome et al.

(10) Patent No.: US 12,440,577 B2
(45) Date of Patent: Oct. 14, 2025

(54) SOL-GEL VAULTS AND METHODS OF MAKING AND USING THEREOF

(71) Applicant: The Regents of the University of California, Oakland, CA (US)

(72) Inventors: Leonard H. Rome, Tarzana, CA (US); Shaily Mahendra, Santa Monica, CA (US); Meng Wang, Los Angeles, CA (US); Valerie Ann Kickhoefer, Sherman Oaks, CA (US); Esther Hui-Jen Lan, Rancho Palos Verdes, CA (US); Bruce S. Dunn, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 977 days.

(21) Appl. No.: 17/427,729

(22) PCT Filed: Feb. 22, 2020

(86) PCT No.: PCT/US2020/019378
§ 371 (c)(1),
(2) Date: Aug. 2, 2021

(87) PCT Pub. No.: WO2020/176363
PCT Pub. Date: Sep. 3, 2020

(65) Prior Publication Data
US 2022/0105199 A1 Apr. 7, 2022

Related U.S. Application Data

(60) Provisional application No. 62/809,848, filed on Feb. 25, 2019.

(51) Int. Cl.
*A61K 47/69* (2017.01)
*A61K 9/06* (2006.01)
(Continued)

(52) U.S. Cl.
CPC ............ *A61K 47/6903* (2017.08); *A61K 9/06* (2013.01); *A61K 38/43* (2013.01); *A61K 47/24* (2013.01); *A61K 47/6927* (2017.08)

(58) Field of Classification Search
CPC ...... A61K 47/6903; A61K 9/06; A61K 38/43; A61K 47/24; A61K 47/6927
See application file for complete search history.

(56) References Cited

U.S. PATENT DOCUMENTS 6,495,352 B1 * 12/2002 Brinker .................. C12N 11/14
436/829
2013/0224828 A1 8/2013 Finn
(Continued)

OTHER PUBLICATIONS

Wang et al ("Sol-gel immobilized vault nanoparticles for water treatment applications"; published Aug. 20, 2016 in Abstracts of Papers of the American Chemical Society (vol. 252); retrieved from https://scimeetings.acs.org/exhibit/Sol-gel-immobilized-vault-nanoparticles/2516854) (Year: 2016).*
(Continued)

*Primary Examiner* — Thomas J. Visone
*Assistant Examiner* — Georgiana C Reglas
(74) *Attorney, Agent, or Firm* — Suzannah K. Sundby, Esq.; Canady + Lortz LLP

(57) ABSTRACT

A sol-gel vault which comprises a complex between a vault particle and a sol-gel. The vault particle comprises one or more one or more passenger molecules. At least one of the one or more passenger molecules is an mINT passenger molecule. At least one of the one or more passenger molecules is a protein. At least one of the one or more passenger molecules is an enzyme. The sol-gel is a silica-based sol-gel.

4 Claims, 14 Drawing Sheets

(51) Int. Cl.
A61K 38/43 (2006.01)
A61K 47/24 (2006.01)

(56) References Cited

U.S. PATENT DOCUMENTS

2014/0363514 A1 12/2014 Koyakutty
2016/0016801 A1* 1/2016 Bryan .................... C01B 32/16
 521/154
2016/0367653 A1 12/2016 Rome

OTHER PUBLICATIONS

Wang et al (ACS Nano. Nov. 2, 20154;9(11):10931-40) (Year: 2015).*
Wang et al (Efficient biodegradation of bisphenol a by enzymes packaged in vault nanoparticles published Mar. 13, 2016 in Abstracts of Papers of the American Chemical Society (vol. 251); Retrieved from https://scimeetings.acs.org/exhibit/Efficient-biodegradation-bisphenol-enzymes-packaged/2400105) (Year: 2016).*
Singh et al (Advances in Colloid and Interface Science 214 (2014) 17-37) (Year: 2014).*
Castelijns et al (J. Phys. Chem. B 2007, 111, 12383-12388) (Year: 2007).*
Shalev et al (Materials (Basel). Feb. 25, 2011;4(3):469-486) (Year: 2011).*
Extended European Search Report received in EP 20763710.9 mailed Oct. 21, 2022.
Han et al., Targeted vault nanoparticles engineered with an endosomolytic peptide deliver biomolecules to the cytoplasm, Aug. 23, 2011, pp. 6128-6137, vol. 5, No. 8, Publisher: ACS Nano.
Rome & Kickhoefer, Development of the vault particle as a platform technology, Feb. 26, 2013, pp. 889-902, vol. 7, No. 2, Publisher: ACS Nano.
Yang et al., Self-Immobilization of Car9 Fusion Proteins within High Surface Area Silica Sol-Gels and Dynamic Control of Protein Release, Oct. 19, 2016, pp. 2450-2459, vol. 27, No. 10, Publisher: Bioconjug Chem.
International Search Report received in PCT/US2020/019378, mailed Jun. 15, 2020.
Written Opinion received in PCT/US2020/019378, mailed Jun. 15, 2020.
Chiriac et al., "Sol gel method performed for biomedical products implementation", Oct. 2010, pp. 990-1013, vol. 10, No. 11, Publisher: Mini Rev Med Chem.
Danks, et al., "The evolution of sol-gel chemistry as a technique for materials synthesis", 2016, pp. 91-112, vol. 3, No. 2, Publisher: Materials Horizons.

* cited by examiner

-- PRIOR ART --

SOL-GEL VAULTS AND METHODS OF MAKING AND USING THEREOF

CROSS-REFERENCE TO RELATED APPLICATIONS

This application claims the benefit of U.S. Patent Application No. 62/809,848, filed Feb. 25, 2019, which is herein incorporated by reference in its entirety.

BACKGROUND OF THE INVENTION

1. Field of the Invention

The present invention generally relates to vault particles and methods thereof.

2. Description of the Related Art

Known as the largest cytoplasmic ribonucleoprotein particles, vaults have been isolated from numerous eukaryotic species, whose structure is highly conserved and has a unique barrel-like morphology (Kedersha & Rome, 1986). The major vault protein (MVP) is the most abundant component of native vaults, and accounts for about 75% of the total protein mass in the particle (Kedersha et al., 1991). Seventy-eight copies of MVP are assembled into the barrel-like shell of the particle co-translationally on the polyribosome (Mrazek et al., 2014; Tanaka et al., 2009). Multiple copies of two additional protein components, vault poly (ADP-ribose) polymerase (VPARP) and telomerase-associated protein-1 (TEP1), and one or more copies of the non-coding vault RNA are found in native vault particles (Kickhoefer et al., 1993; Kickhoefer et al., 1999a; Kickhoefer et al., 1999b). Cryo-EM reconstruction of rat liver vaults treated with ribonuclease and vaults purified from VPARP and TEP1 knockout mice localized these three components to the inside of the vault lumen (Kickhoefer et al., 2001; Mikyas et al., 2004). Although the biological function of native vault particles and their components is still mysterious, vaults have been implicated in a broad range of cellular functions including innate immunity, multi-drug resistance, cell signaling, nuclear-cytoplasmic transport, mRNA localization, and nuclear pore assembly (Berger et al., 2009; Rome & Kickhoefer, 2013).

Recombinant vaults are non-toxic, non-immunogenic, and biodegradable, which makes the particle an ideal carrier for macromolecules (Rome & Kickhoefer, 2013). In fact, enzymes, such as manganese peroxidase (MnP), encapsulated in the interior cavities of vault particles exhibit enzymatic activity (Wang et al., 2015). Taking advantage of these properties, recombinant vaults have been engineered to enhance their functionality with various added domains to impart new activities like: cell targeting (Kickhoefer et al., 2009), cytoplasmic targeting (Han et al., 2011), fluorescence (Kickhoefer et al., 2005), and amphiphilicity (Buehler et al., 2011), which are being explored in therapeutic applications (Kar et al., 2011). In fact, vault particles comprising therapeutic agents immobilized on and/or packaged within their interior cavities exhibit promising medical and biological applications, e.g., treat cancer (Kar et al., 2011; Baratelli et al., 2008; Champion et al., 2009; Han et al., 2011; Sharma et al., 2000; Yang et al., 2004; Yang et al., 2006), prevent infections (Heijnen et al., 1996; Moore et al., 2003; Pal et al., 2005; Ifere et al., 2007; Kelly et al., 1996), and tissue or cell-specific drug delivery (Buehler et al., 2011; Han et al., 2011; Lai et al., 2009).

SUMMARY OF THE INVENTION

In some embodiments, the present invention is directed to a sol-gel vault which comprises a complex between a vault particle and a sol-gel. In some embodiments, the vault particle may comprise one or more one or more passenger molecules. In some embodiments, at least one of the one or more passenger molecules is an mINT passenger molecule. In some embodiments, at least one of the one or more passenger molecules is a protein. In some embodiments, at least one of the one or more passenger molecules is an enzyme. In some embodiments, the sol-gel is a silica-based sol-gel.

In some embodiments, the present invention is directed to a sol-gel vault nanocomposite which comprises, consists essentially of, or consists of a plurality of sol-gel vaults as disclosed herein. In some embodiments, the sol-gel vault nanocomposites comprise one or more therapeutic agents directly immobilized in the sol-gel.

In some embodiments, the present invention is directed to a composition which comprises, consists essentially of, or consists of one or more sol-gel vaults and/or or one or more sol-gel vault nanocomposites as disclosed herein. In some embodiments, the compositions further comprise a pharmaceutically acceptable carrier.

In some embodiments, the present invention is directed to a method of treating a subject in need of a given therapeutic agent, which comprises administering to the subject one or more sol-gel vaults, one or more sol-gel vault nanocomposites, or a composition comprising one or more sol-gel vaults and/or one or more sol-gel vault nanocomposites, as described herein, wherein the one or more passenger molecules is the given therapeutic agent. In some embodiments, the given therapeutic agent is provided as the one or more therapeutic agents directly immobilized in the sol-gel.

In some embodiments, the present invention is directed to a method of counteracting, degrading, or inactivating a given contaminant or toxin in a material, which comprises contacting the material with one or more sol-gel vaults, one or more sol-gel vault nanocomposites, or a composition comprising one or more sol-gel vaults and/or one or more sol-gel vault nanocomposites, as described herein, wherein the one or more passenger molecules is a protein or enzyme that counteracts, degrades, or inactivates the given contaminant or toxin.

In some embodiments, the present invention is directed to a method of making a sol-gel vault or a sol-gel vault nanocomposites as described herein, which comprises mixing an amount of vault particles with an amount of a sol-gel precursor at a pH range of about 5.5-6.5 for about 30 minutes or more. In some embodiments, the amount of a sol-gel precursor is in excess of the amount of vault particles. In some embodiments, method further comprises adding one of the one or more passenger molecules to the mixture of containing the vault particles and the sol-gel precursor. In some embodiments, the sol-gel precursor is a silica precursor.

As disclosed herein, the vault particle of the sol-gel vaults may be any given vault particle. That is, the vault particles of the sol-gel vaults may be formed from any given major vault protein (MVP) or derivative thereof. Similarly, the one or more passenger molecules may be any molecule that is desired to be carried on or in the vault particle or immobilized in the sol-gel.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description explain the principles of the invention.

DESCRIPTION OF THE DRAWINGS

This invention is further understood by reference to the drawings wherein:

FIG. 1, TEM image of a prior art composition comprising vault particles (i.e., without being complexed with a sol-gel.

FIG. 2, TEM image of a sol-gel vault nanocomposite. The sol-gel vault nanocomposite comprises a plurality of vault particles of similar shape and size as naked vaults. Excerpt superimposing the barrel-like shape of vaults over the sol-gel vaults.

FIG. 3, TEM image of recovered sol-gel vaults after dissolving sol-gel vault nanocomposites at high pH.

FIG. 4, Stoichiometric correlation between the amount of vaults added and mixed with the sol-gel precursors and the amount of silica in sol-gel vault nanocomposites formed at pH 5.5.

FIG. 5, pH dependence of vault-induced silica precipitation.

FIG. 6, Proposed templating route to sol-gel vault nanocomposites. Vault particles are nucleation sites in the first step, and induce silica deposition and condensation on their surfaces. In the final step, primary sol-gel vaults form aggregates, thereby resulting in sol-gel vault nanocomposites.

FIG. 7, Yield of fluorescence intensities of sol-gel vaults comprising mCherry-INT as passenger molecules. The resultant sol-gel vaults (mCherry-INT/vault/MSNs) show similar fluorescence intensities to naked vaults comprising mCherry-INT (mCherry-INT/vault), over a wide protein concentration. Fluorescence intensities in the supernatant (extracted after centrifuging mCherry-INT/vault/MSN and mCherry-INT/vaults) that are close to background levels indicate that all of the mCherry-INT/vault/MSNs and the mCherry-INT/vaults were firmly incorporated into the sol-gel matrix.

FIG. 8, Leaching of mCherry-INT from the sol-gel vaults is negligible in 47 days.

FIG. 9, Thermal stability of GL-INT at 37° C., showing that GL-INT entrapped in sol-gel vaults (GL-INT/vault/MSN) is more robust than either unencapsulated (GL-INT) or encapsulated GL-INT in naked vaults (GL-INT/vault).

FIG. 10, GL-INT entrapped in sol-gel vaults exhibits the best resistance to surfactant denaturation in the presence of 0.05% SDS at pH 6.5 room temperature.

FIG. 11, Kinetics of ABTS oxidation catalyzed by sol-gel vaults (MnP-INT/vault/MSN) and naked vaults (MnP-INT/vault) comprising MnP-INT as the passenger molecule and native MnP passively packaged within sol-gel vaults (MnP/vault/MSN). Free MnP immobilized in sol-gel derived silica using TMOS as the precursor without any vault particles, showed no activity.

FIG. 12, Relative activities of MnP-INT encapsulated within sol-gel vaults (MnP-INT/vault/MSN) and naked vaults (MnP-INT/vault) and unencapsulated MnP-INT (MnP-INT) incubated at 35° C., 40° C., 45° C. and 50° C. for 30 minutes.

FIG. 13, Relative activities of the same sol-gel vaults (MnP-INT/vault/MSN) in ABTS oxidation in repeated uses. Arrows indicate overnight storage at 4° C.

FIG. 14, The sol-gel vaults (MnP-INT/vault/MSN) catalyzes removal of BPA and BPF.

FIG. 15, Repeated use of the same sol-gel vaults (MnP-INT/vault/MSN) in removing BPA. Removal rates are normalized to the rate obtained in the first use.

FIG. 17, Amine groups are transformed to methyl groups using sulfo-N-hydroxysulfosuccinimide (sulfo-NHS).

FIG. 18, Amine groups are transformed to carboxylic acids using citraconic anhydride (CA).

FIG. 19, pH dependence of sulfo-NHS modified vault-induced silica precipitation.

FIG. 20, pH dependence of CA modified vault-induced silica precipitation.

FIG. 22, Relative activities of manganese peroxidase in the form of sol-gel vaults (MnP-INT/vault/MSN), naked vaults (MnP-INT/vault), and INT fusions (MnP-INT) after 10 minutes incubation in solutions containing 15% methanol or isopropanol at room temperature.

FIG. 23, Relative activities of manganese peroxidase in the form of sol-gel vaults (MnP-INT/vault/MSN), naked vaults (MnP-INT/vault), and INT fusions (MnP-INT) after 10 minutes incubation in solutions containing 5%, 10%, and 15% methanol at 45° C.

FIG. 24, Relative activities of MnP in the form of sol-gel vaults (MnP-INT/vault/MSN), naked vaults (MnP-INT/vault), and free MnP (not covalently attached to INT) incubated in tap water at 15° C.

FIG. 25, Relative activities of manganese peroxidase in the form of sol-gel vaults (MnP-INT/vault/MSN), naked vaults (MnP-INT/vault), and free MnP incubated in groundwater at 15° C.

DETAILED DESCRIPTION OF THE INVENTION

Biosilicification is a method that is often used to immobilize proteins and enzymes in a silica matrix. Biosilicification relies on random entrapment of proteins during silica formation, thus immobilization is not guaranteed and successful immobilization usually requires large quantities of the protein to be immobilized in the silica matrix. Additionally, immobilization efficiencies vary with the given protein.

As described herein, proteins and enzymes were immobilized in sol-gel vaults and sol-gel vault nanocomposites by encapsulating the proteins and enzymes in naked vaults prior to sol-gel synthesis (e.g., silica condensation). Under this "vault encapsulated immobilization" method, a 100% immobilization efficiency of the proteins and enzymes was obtained over a wide concentration range (e.g., 15 µg/mL-230 µg/mL of vaults). Using vault encapsulated immobilization, immobilization efficiencies of 100% are expected for any given passenger molecule packaged within the interior cavity of naked vaults so long as an excess amount of sol-gel precursors is present during sol-gel synthesis.

Figure 11:
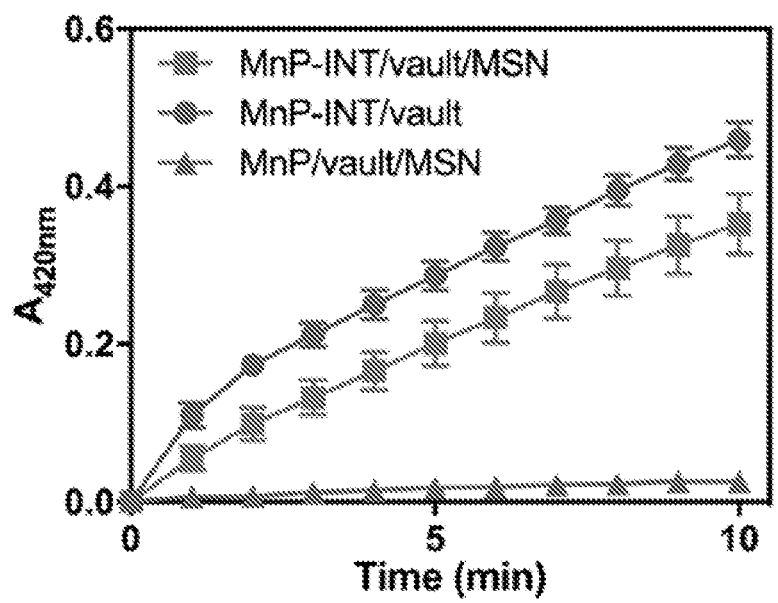
FIG. 11 to FIG. 13: Engineering of sol-gel vaults with enzymatic properties. MnP fused to INT (MnP-INT) is used as the given enzyme of interest.
Figure 26:
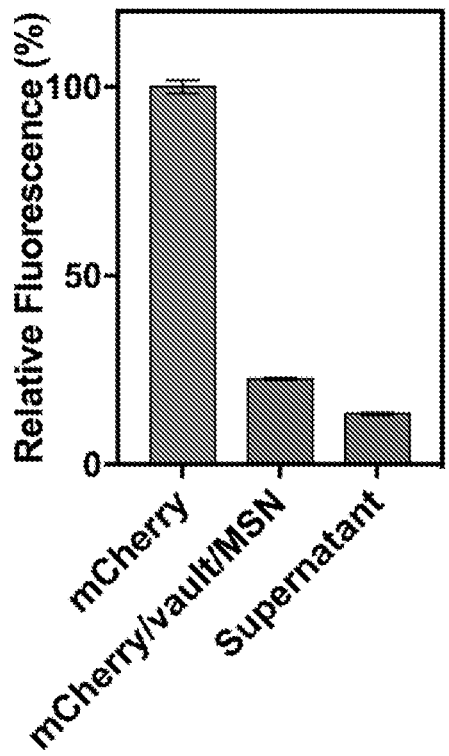
FIG. 26: Immobilization of free mCherry (not covalently attached to INT) in sol-gel vaults by adding free mCherry to a solution containing empty naked vaults and sol-gel precursors. mCherry is immobilized in the sol-gel itself and immobilized on sol-gel vaults through a random entrapment event during the sol-gel vault formation. Comparing the total fluorescence intensities of mCherry/vault/MSNs and the supernatant with the total fluorescence intensity of the initial amount of free mCherry (mCherry) added to the empty naked vaults and sol-gel precursors, significant loss of fluorescence was observed. The total fluorescence intensity of mCherry/vault/MSNs was below 25% of the fluorescence intensity of the initial amount of free mCherry. The combined fluorescence intensity of mCherry/vault/MSNs and supernatant is about 35% of the fluorescence intensity of the initial amount of free mCherry.
Figure 27:
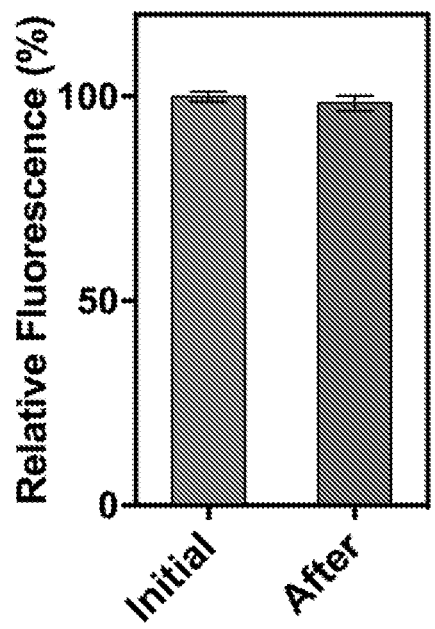
FIG. 27: Effects of sol-gel precursors on the fluorescence of free mCherry. No significant difference in fluorescence intensity was observed before and after incubating free mCherry with pre-hydrolyzed TMOS in the absence of vault particles, suggesting sol-gel precursors do not quench mCherry fluorescence or render mCherry inactive. Thus, the decrease in fluorescence observed for mCherry/vault/MSNs is likely the result of protein denaturation of mCherry during silica condensation.

Vault encapsulated immobilization also resulted in nanocomposites having significantly higher protein and enzyme activities compared to nanocomposites having the proteins and enzymes directly immobilized in a sol-gel matrix without first encapsulating the proteins and enzymes in vault particles. That is, sol-gel vaults containing mINT passenger molecules, MnP-INT/vault/MSNs and mCherry-INT/vault/MSNs, exhibited activities of 100% and 78%, respectively. Conversely, the direct immobilization of free mCherry by mixing free mCherry with naked vaults and sol-gel precursors resulted in mCherry/vault/MSNs having a decrease of about 64% in overall fluorescence intensity, and the fluorescence yield in the silica was below 25% (FIG. 26). In the case of MnP, enzyme activity in silica was even lower, only about 5.5% (FIG. 11). The losses in activity by immobilizing the proteins and enzymes directly in the sol-gel matrix are likely the result of protein denaturation during sol-gel formation.

Thus, vault encapsulated immobilization likely results in the high activities observed for MnP-INT/vault/MSNs and mCherry-INT/vault/MSNs because the passenger molecules are encapsulated within and thereby protected by the shell of MVPs therearound, the interior vault cavity likely allows conformational changes that are important for enzymatic activity. Moderately lower activities of passively packaged passenger molecules compared to mINT passenger molecules prior to sol-gel formation are expected because, unlike INT anchored mINT passenger molecules, some passively packaged passenger molecules may be exposed to denaturing conditions during sol-gel synthesis.

As disclosed herein, mCherry-INT encapsulated in sol-gel vaults showed negligible leakage in 47 days, and MnP-INT/vault/MSNs exhibited only 10% loss of activity after 30 repeat cycles. The minimal leakage and reusability of these passenger molecules encapsulated in sol-gel vaults is likely due to their double encapsulation—encapsulation within the interior cavity of the vault particles which vault particles are encapsulated by a sol-gel layer.

Synthesis of Sol-Gel Vaults

The sol-gel vaults exemplified herein were made by mixing recombinant vaults with pre-hydrolyzed tetramethyl orthosilicate (TMOS) at pH 6. In the presence of the vault particles, formation of silica precipitates from (a) TMOS, or (b) pre-hydrolyzed TMOS was observed in 1 hour, while no precipitation was observed in the presence of bovine serum albumin (BSA) or in a solution containing sol-gel precursors only. Specifically, sol-gel vault nanocomposites having diameters of about 400 nm occurred in about 30 minutes, while no precipitate formed in the absence of vault particles or in the presence of bovine serum albumin (BSA) at the same protein concentration for at least six hours.

Figure 1:
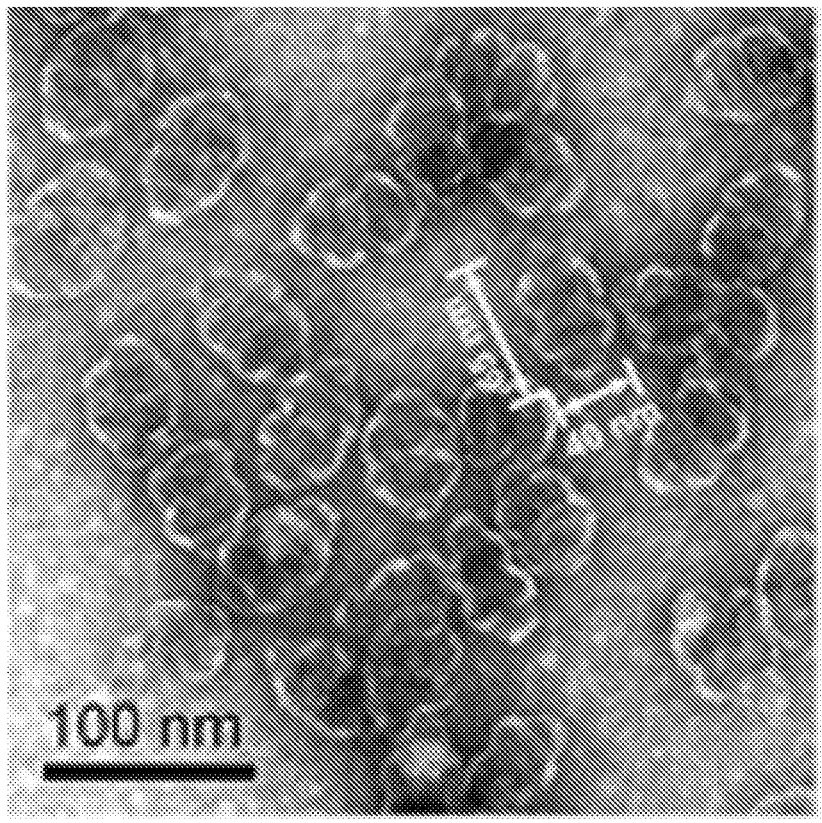
FIG. 1 to FIG. 6: Formation of sol-gel vault nanocomposites.
Figure 2:
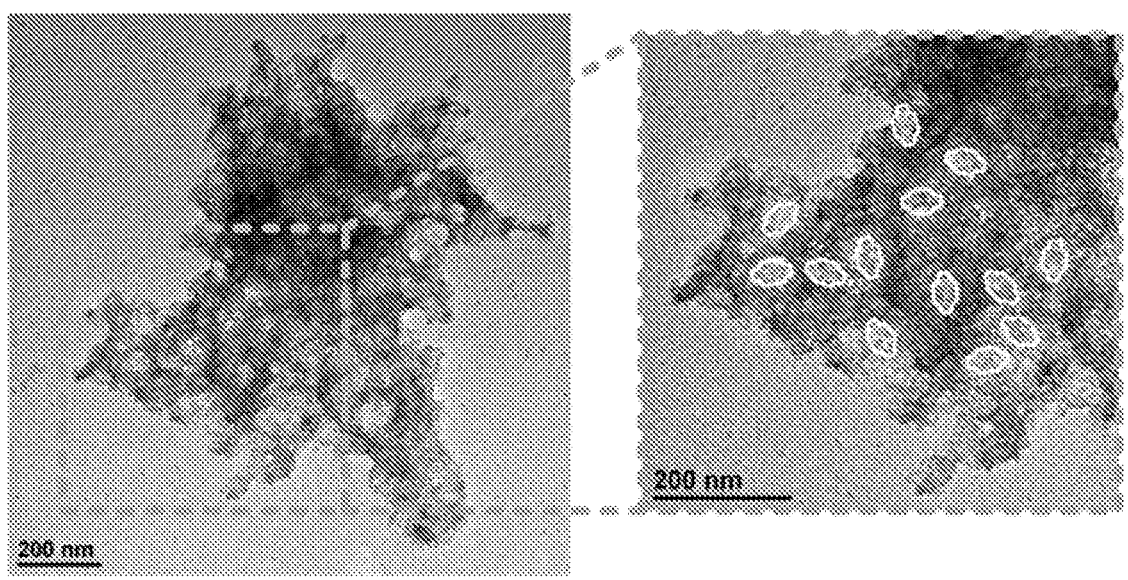
Figure 3:
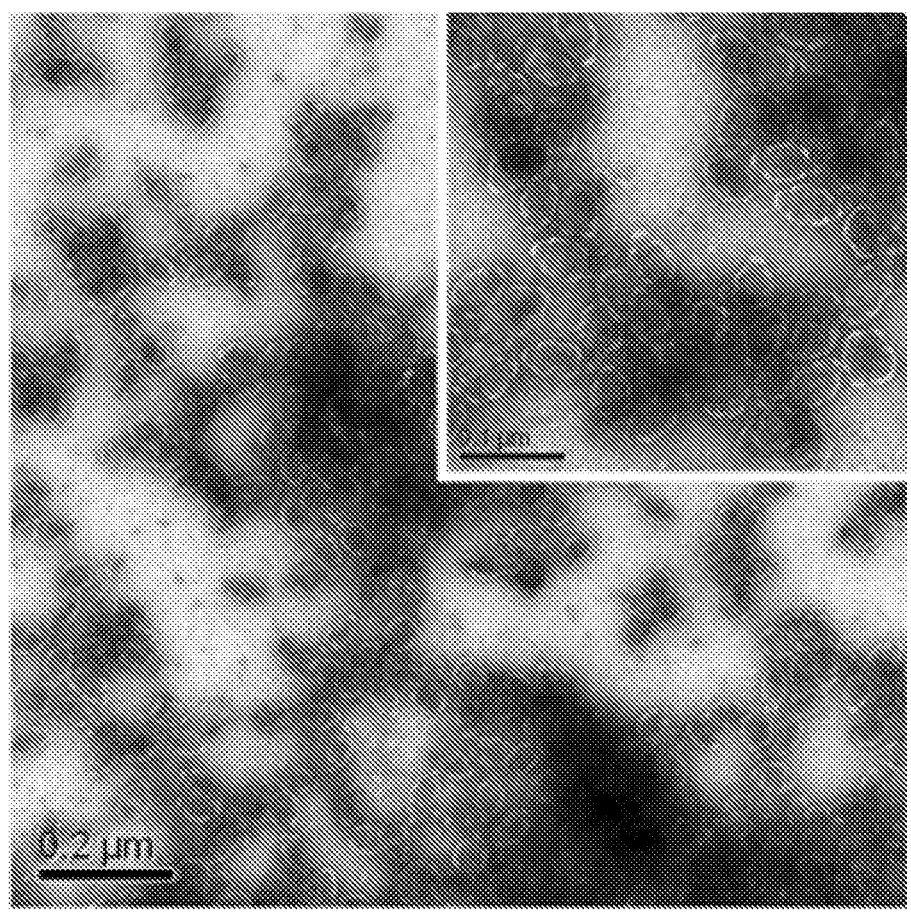
Figure 4:
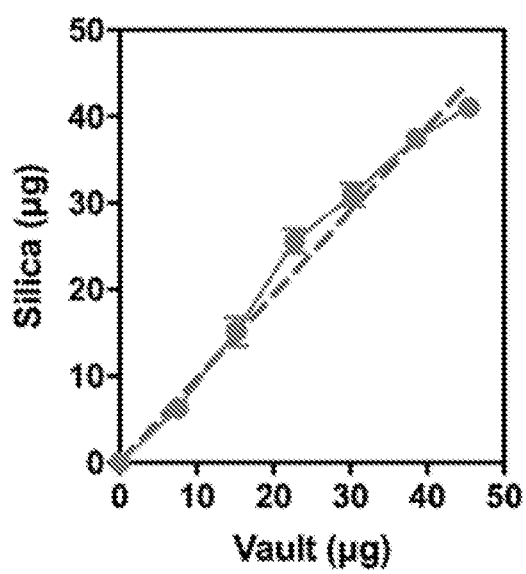

In the presence of excess pre-hydrolyzed TMOS, vault particles completely co-precipitated with silica at all protein concentrations tested (15 µg/mL to 230 µg/mL), indicating interactions between vault particles and sol-gel precursors that are favorable for sol-gel formation. Stoichiometric analysis revealed that the amount of silica in the sol-gel vault nanocomposites and the amount of vaults added was proportional, a mass ratio of 1:1 (FIG. 4). A transmission electron microscopic (TEM) image of a sol-gel vault nanocomposite is shown in FIG. 2. The nanocomposite is 10 times larger than a vault particle and contains aggregates of similar shape and size to vault particles. The sol-gel vault nanocomposites could be dissolved at high pH resulting in recovery of abundant intact vault particles (FIG. 3). These experiments indicate that vaults maintain structural integrity during sol-gel formation and are incorporated intact into the formed nanocomposites, which explains the observation of uniform vault-shaped mesopores in the sol-gel matrix.

Figure 5:
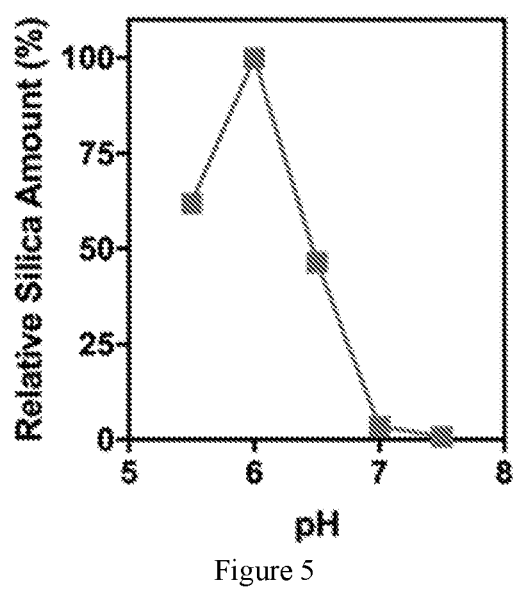

The formation of these silica-based sol-gel vault nanocomposites appears to occur through a neutral charge templating route, as evidenced by its unique pH dependency. Sol-gel vaults only formed in the weakly acidic pH range (5.5-6.5), while no silica precipitate was observed when the pH was increased to 7 or 7.5 (FIG. 5). The vault particle is assembled from multiple copies of MVP proteins, which are calculated to have an isoelectric point (pI) around 5.5. Peptide sequence analysis shows that positive and negative amino acids are relatively evenly distributed throughout the vault shell without local clusters of charged residues, leaving vault particles having a nearly neutral charge at weakly acidic pH. Thus, in the 5.5-6.5 pH range, electrostatic repulsion between vault particles and sol-gel precursors is reduced, thereby allowing direct interaction between these two species. In addition, vaults, as supra-protein complexes, consist of over nine thousand amino acid residues containing hydroxyl and imidazole groups, which are sites capable of mediating silicification. These chemical structures most likely form hydrogen-bonding interactions with $Si(OCH_3)_{4-x}(OH)_x$ that resulted from hydrolysis of TMOS, leading to condensation of silica on the vault surfaces. At pH 7 or higher, vaults as well as siliceous species are negatively charged, and the resultant electrostatic repulsion between these two species prevents silica deposition on the particle surface.

Figure 6:
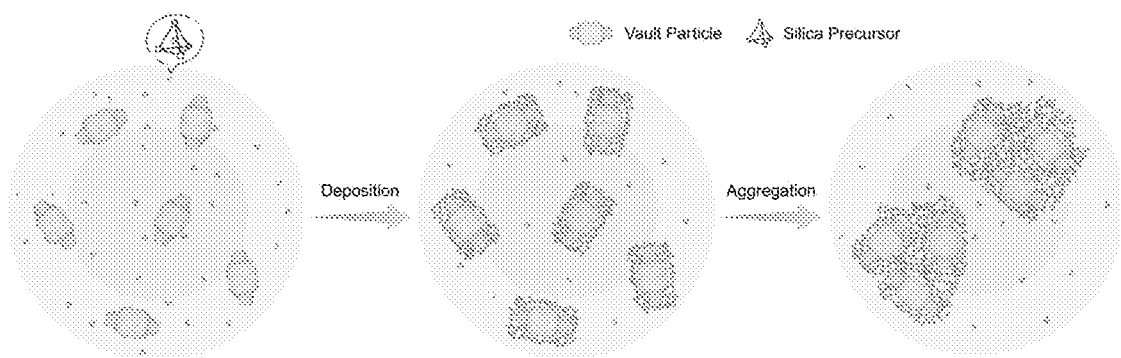
Figure 17:
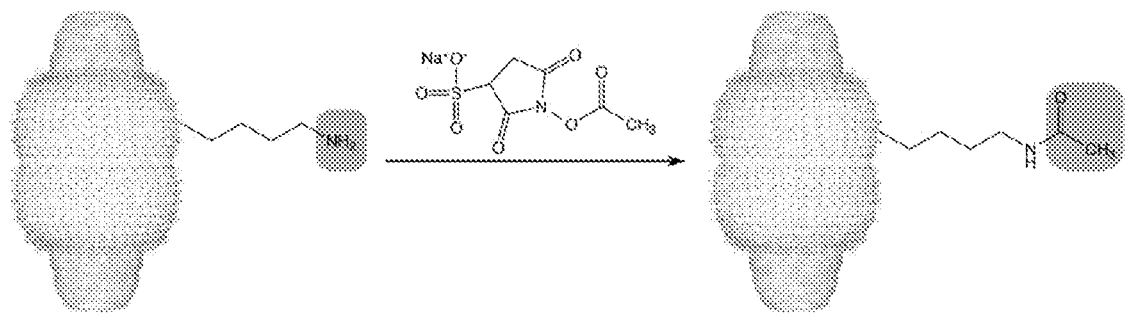
FIG. 17 to FIG. 20: Chemical modification of vault particles.
Figure 18:
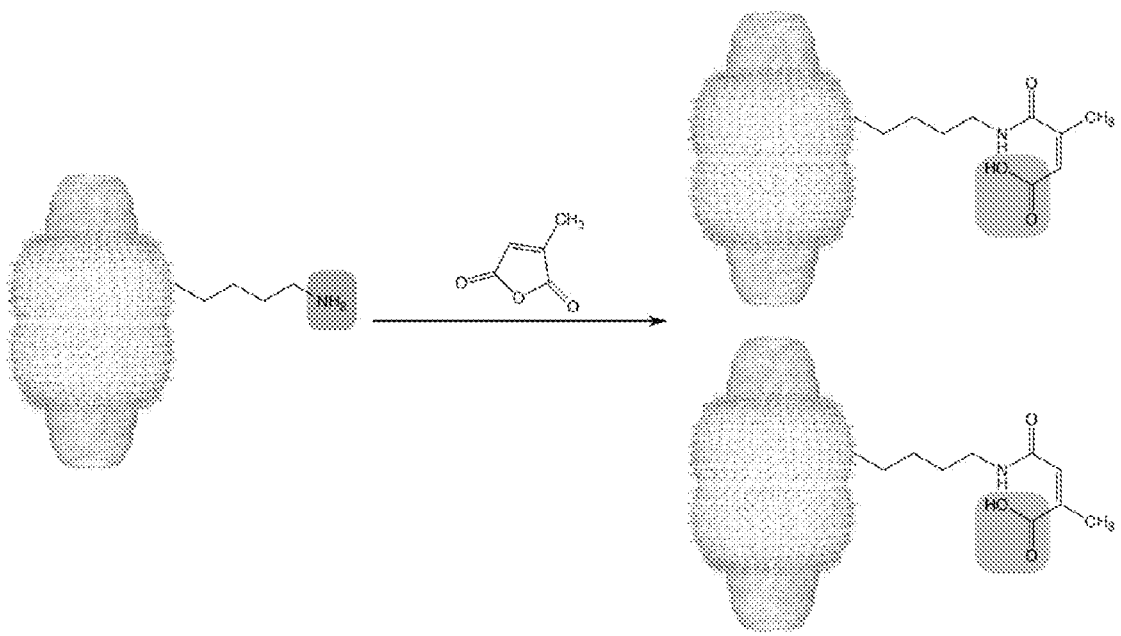
Figure 19:
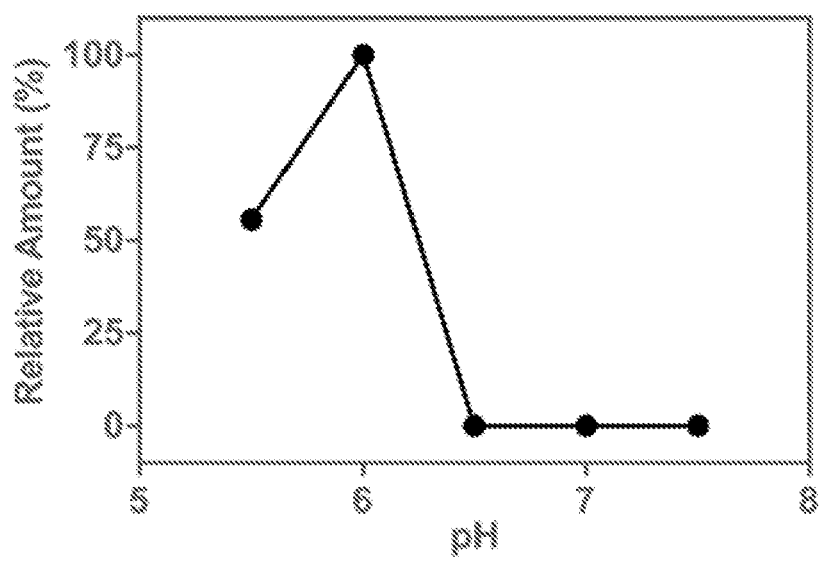
Figure 20:
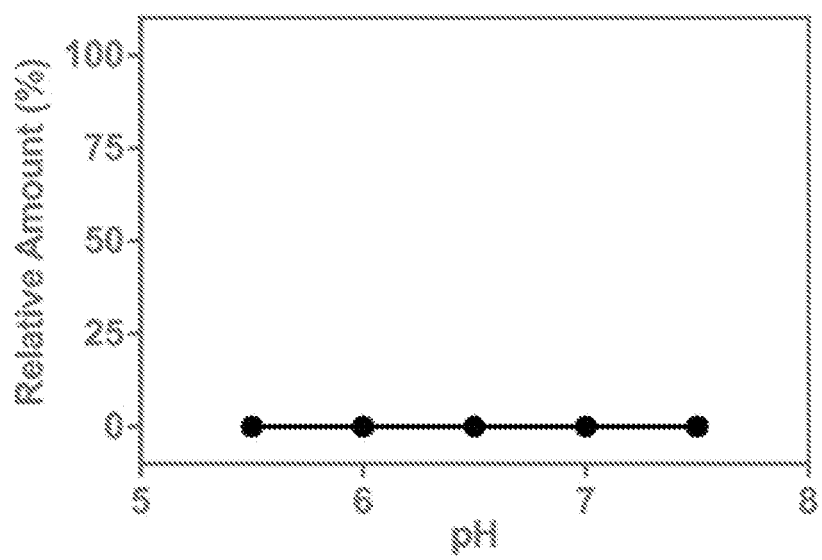

Further evidence supporting templating by neutral charged vault particles is obtained using chemically modified vault particles. Upon transforming the amine groups (which contribute positive charges) of MVP to neutral methyl groups (FIG. 17), the pI of MVP was lowered, and the charge of vaults was shifted towards a more negative pI, leading to no silica precipitation at pH 6.5 (FIG. 19). Converting cationic amines of MVP to anionic carboxylic acids (FIG. 18), the MVP pI was further reduced and the modified vault particles were not able to induce silica formation in the tested pH range (FIG. 20). Moreover, when using denatured MVPs, silica precipitation was also observed, but only in larger non-colloidal aggregates, suggesting that sol-gel formation is different from that observed with non-denatured intact vaults. These results suggest that silica precipitation is likely by physical interactions between the intact vault particles and silica precursors. At an early stage, neutral charged vault particles act as nucleation sites, where sol-gel precursors deposit and condense thereby forming primary complexes of sol-gel vaults. Afterwards, silica layers continue to grow and connect the primary complexes thereby forming sol-gel vault nanocomposites (FIG. 6).

Therefore, in some embodiments, the present invention is directed to methods of making sol-gels which comprise using naked vaults as templating agents. In some embodiments, the sol-gel is a silica-based sol-gel. In some embodiments, the vault particles comprise one or more passenger molecules. In some embodiments, the one or more passenger molecules are proteins. In some embodiments, the one or more passenger molecules are enzymes. In some embodiments, the one or more passenger molecules are mINT passenger molecules. In some embodiments, the one or more passenger molecules are passively packaged passenger molecules.

Activity and Stability of Passenger Molecules Immobilized in Sol-Gel Vaults

Figure 7:
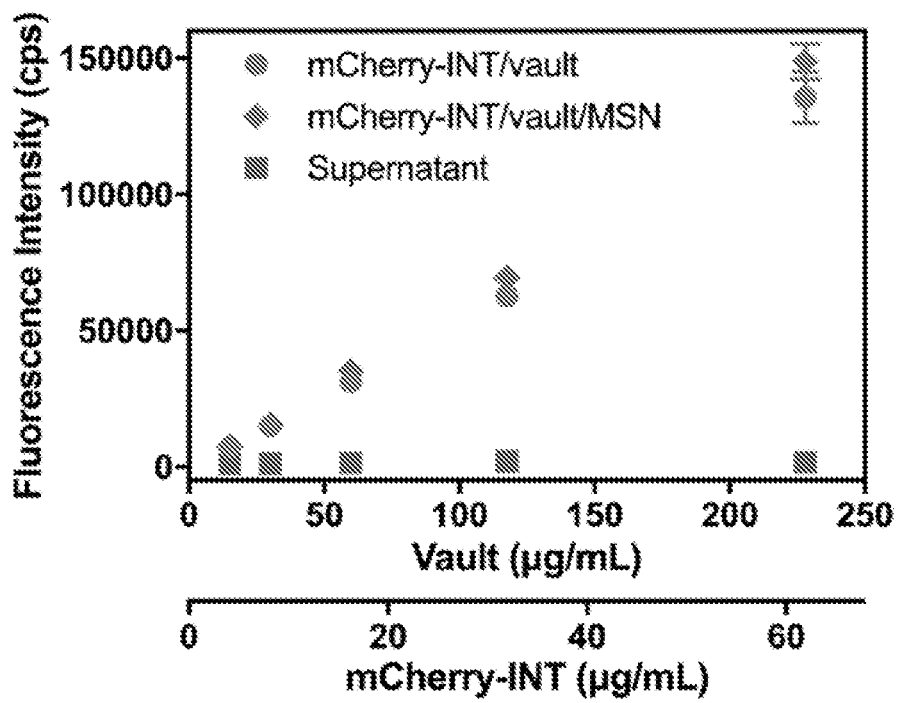
FIG. 7 to FIG. 10: Engineering of sol-gel vaults with fluorescent properties.
Figure 8:
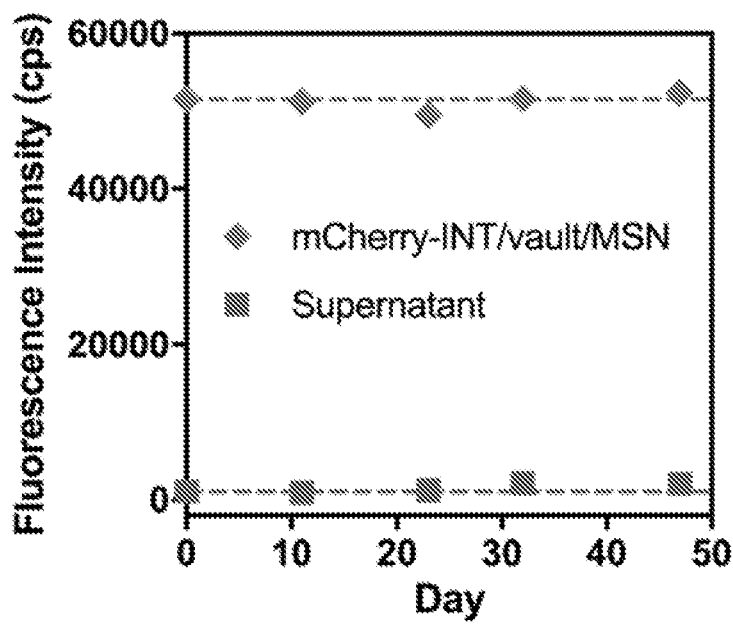
Figure 21:
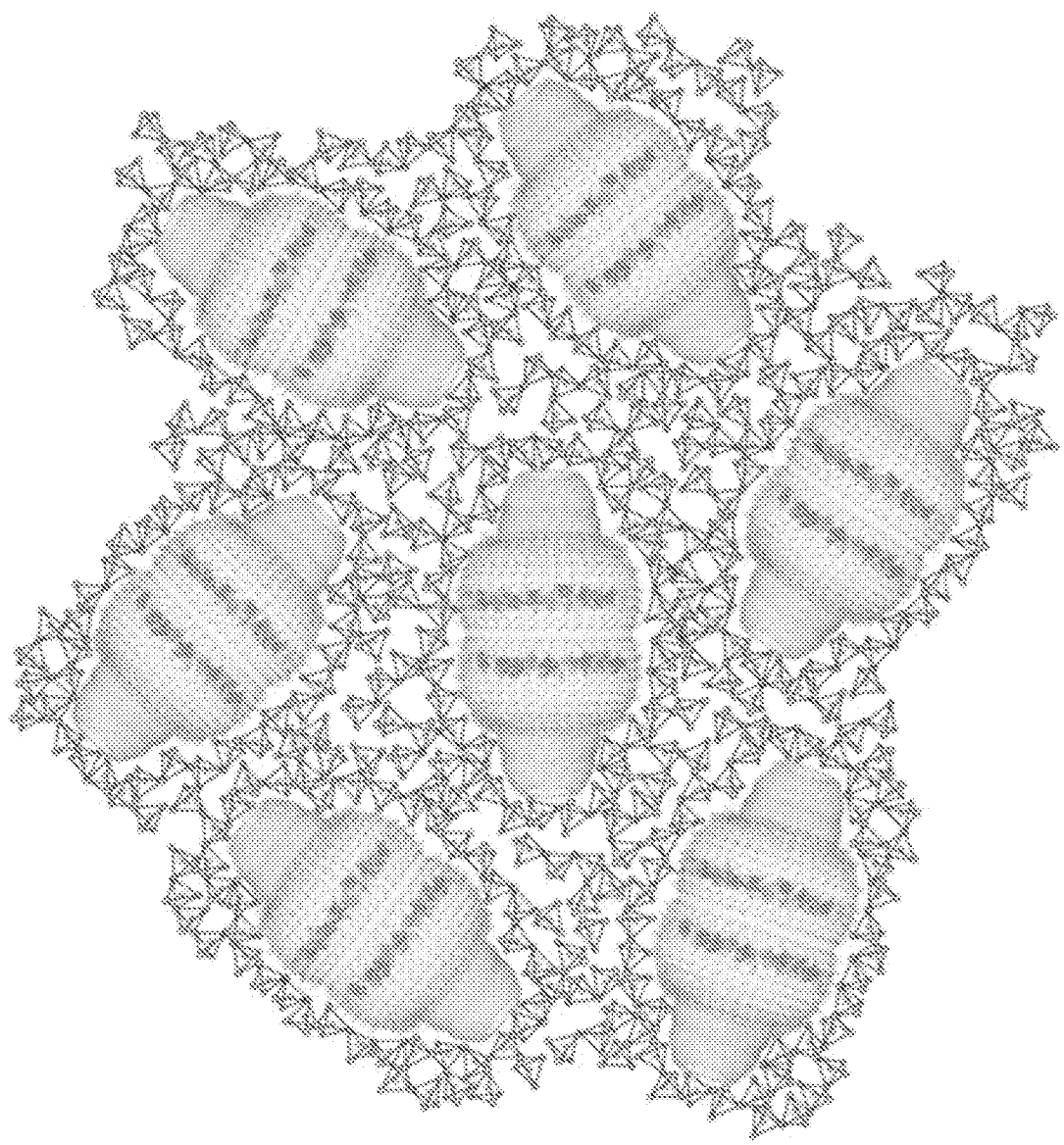
FIG. 21: Schematically shows sol-gel vaults comprising passenger molecules packaged within the internal cavities of the vault particles. The passenger molecules are first encapsulated in vault particles by mixing the mINT passenger molecules and vault particles together and then the vault particles comprising the passenger molecules are mixed with sol-gel precursors to make sol-gel vaults comprising the passenger molecules packaged within the internal cavities of the vault particles.

To determine the activity and stability of passenger molecules encapsulated in sol-gel vaults, mCherry-INT/vaults were mixed with hydrolyzed TMOS at pH 5.5 to produce mCherry-INT/vault/MSNs (FIG. 21). The immobilization efficiencies and yields of fluorescence intensity of mCherry-INT in silica were both about 100% over the concentration range of mCherry-INT/vaults that were tested (FIG. 7). Only background fluorescence intensities were detected in the supernatant collected after centrifuging reaction mixtures to pellet the sol-gel vaults. The calculated protein loading of mCherry-INT in the sol-gel vaults was about 23% (w/w), which is close to the highest reported protein loading capacity in silica. Evaluation of the leaching of mCherry-INT from mCherry-INT/vault/MSNs demonstrated that the mCherry-INT was entirely retained in the sol-gel vaults over 47 days without any significant leakage (FIG. 8).

Figure 9:
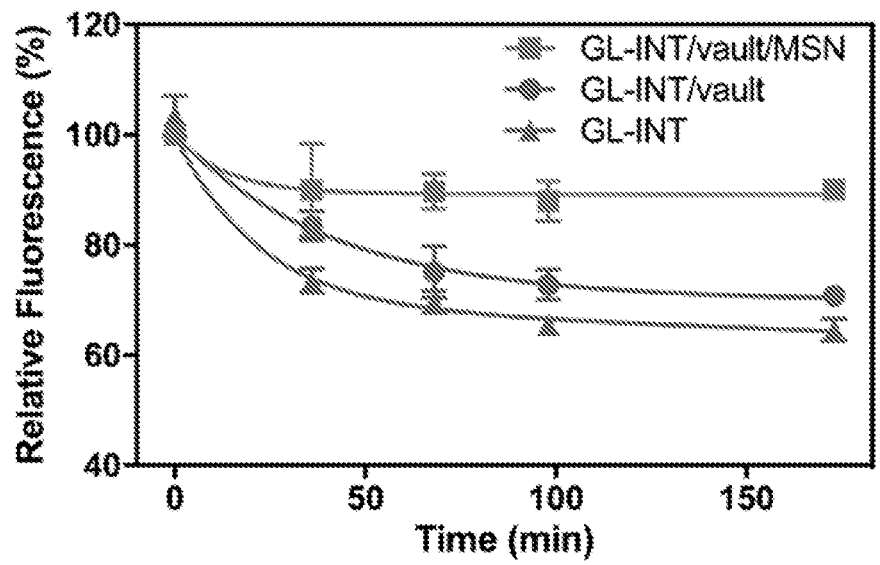
Figure 10:
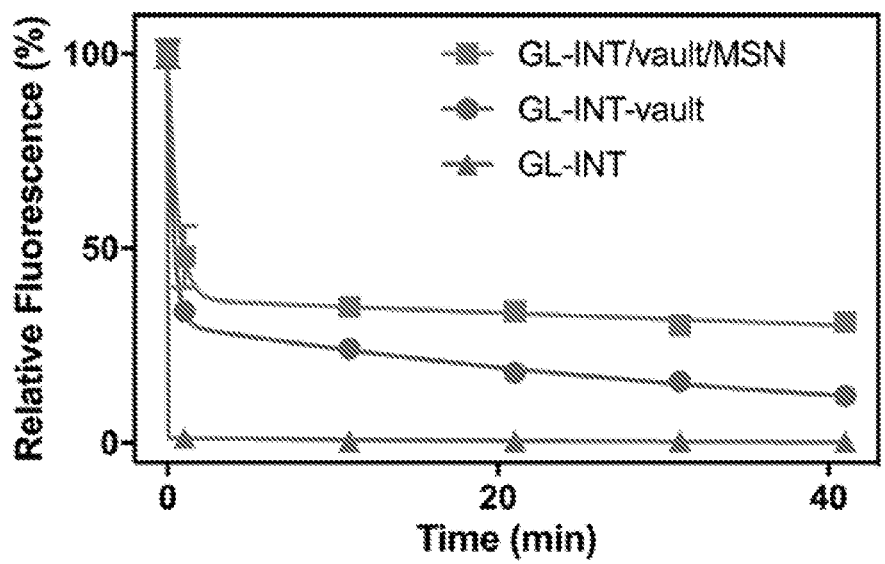

Using the same method, green lantern (GL) sol-gel vaults (GL-INT/vault/MSNs) were prepared. The GL-INT/vault/MSNs also showed about 100% immobilization efficiency and fluorescence intensity yield. In addition, GL-INT encapsulated in sol-gel vaults was significantly more stable. After three hours incubation at pH 6.5 37° C., the GL-INT/vault/MSNs had less than about 10% loss in fluorescent activity, whereas loss in fluorescent activity of unencapsulated GL-INT and GL-INT/vaults was more than about 2.5× higher (FIG. 9). In the presence of strong denaturant sodium dodecyl sulfate (SDS), while unencapsulated GL-INT was completely denatured in one minute, GL-INT immobilized in sol-gel vaults maintained over 30% of its initial fluorescence intensity after 30 minutes (FIG. 10).

Therefore, in some embodiments, the present invention is directed to one or more sol-gel vaults. In some embodiments, the sol-gel of the one or more sol-gel vaults is a silica-based sol-gel. In some embodiments, the one or more sol-gel vaults comprise one or more passenger molecules. In some embodiments, the one or more passenger molecules are proteins. In some embodiments, the one or more passenger molecules are enzymes. In some embodiments, the one or more passenger molecules are mINT passenger molecules. In some embodiments, the one or more passenger molecules are passively packaged passenger molecules. In some embodiments, the one or more sol-gel vaults is in the form of a sol-gel vault nanocomposite.

Figure 12:
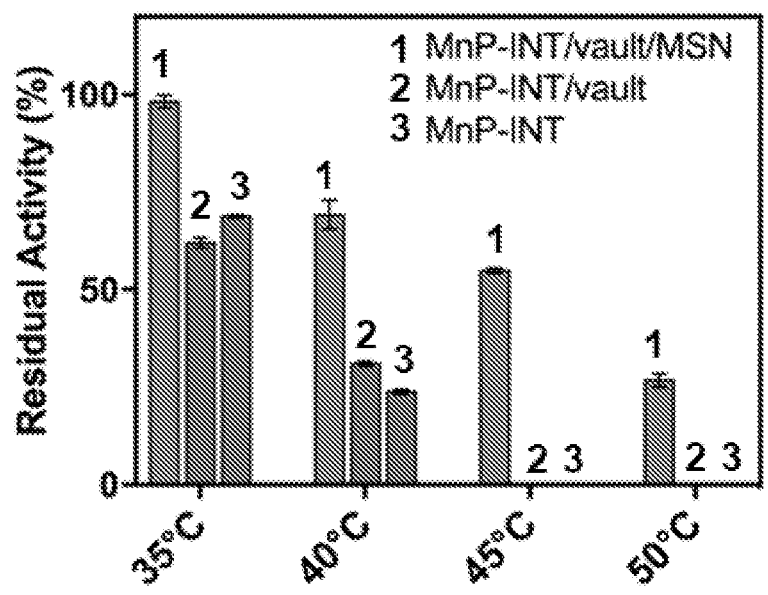
Figure 22:
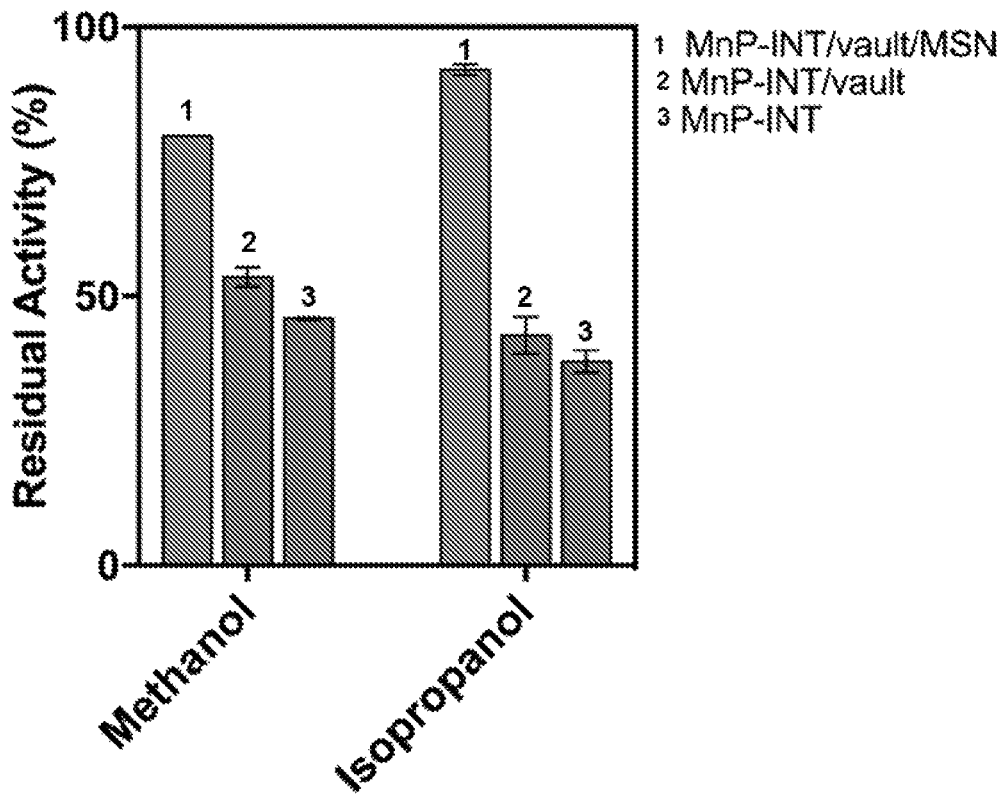
FIG. 22 to FIG. 23: Enhanced stability of enzymes packaged within sol-gel vaults.
Figure 23:
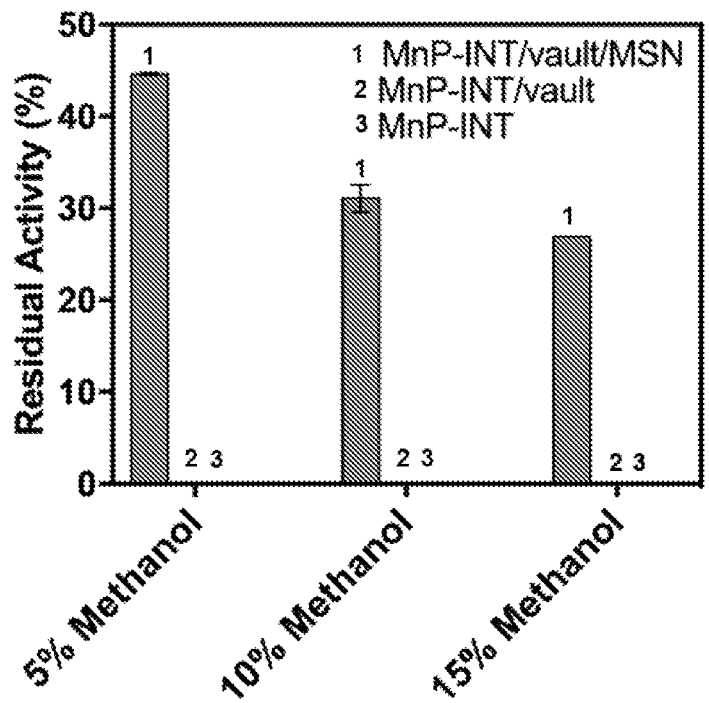

The activity and stability of enzymes immobilized in sol-gel vaults was evaluated using manganese peroxidase (MnP) as the exemplary enzyme. MnP catalyzes substrate oxidation using $H_2O_2$ as electron donor. MnP-INT/vault/MSNs were prepared as described above. The yield of enzymatic activity in the MnP-INT/vault/MSNs was about 77% of the enzymatic activity of the initial amount of MnP-INT/vault and free MnP (MnP/vault/MSN) exhibited little to no enzymatic activity (FIG. 11). MnP-INT encapsulated in sol-gel vaults also showed significantly improved stability against high temperature and organic solvents compared to unencapsulated MnP-INT (MnP-INT) and MnP-INT encapsulated in naked vaults (MnP-INT/vault) (FIG. 12, FIG. 22, FIG. 23). At high temperature, enzyme activity loss was also significantly mitigated by immobilization in sol-gel vaults (FIG. 12). Thirty minutes incubation at 45° C. and 50° C. completely inactivated unencapsulated MnP-INT and MnP-INT/vaults, however, the MnP-INT/vault/MSNs still retained about 55% and about 27% of the initial activity, respectively.

Figure 13:
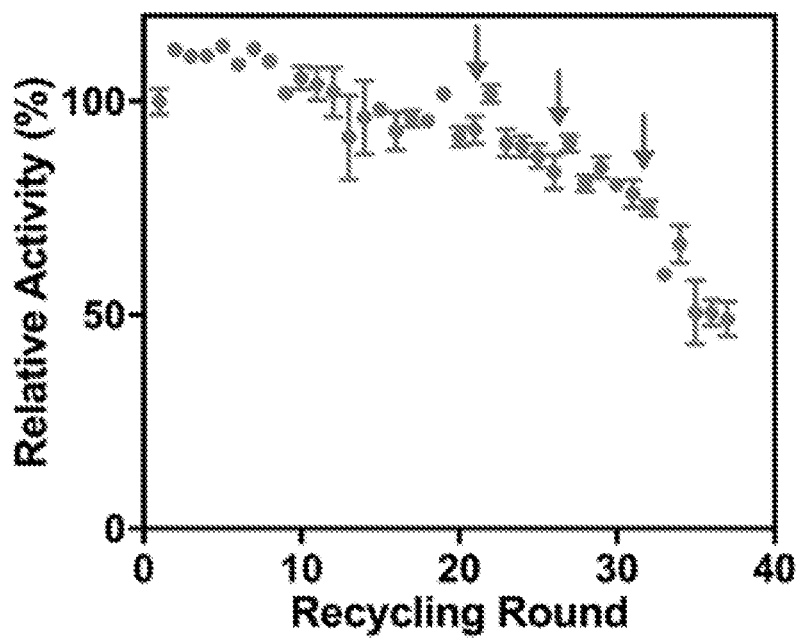

When incubating enzymes in a solution containing 5%, 10%, and 15% methanol at 45° C. for ten minutes, the enzyme immobilized in sol-gel vaults retained about 27-45% of the initial activity, while non-encapsulated MnPs were entirely inactivated (FIG. 23). Moreover, MnP-INT/vault/MSNs were found to have superior reusability. Specifically, using 2,2'-azino-bis(3-ethylbenzothiazoline-6-sulphonic acid) (ABTS) as a test substrate, the MnP-INT/vault/MSNs maintained nearly 100% activity after 12 reuses and about 90% activity after 30 reuses (FIG. 13). The significant drop in activity after 32 reuses is likely the result of the loss of sol-gel vaults themselves due to silica particle cracking of the sol-gel vault nanocomposites after repeated centrifugation.

Therefore, in some embodiments, the present invention is directed to storage stable, heat resistant, and/or reusable enzymatic compositions which comprise one or more sol-gel vaults having one or more given enzymes as passenger molecules. In some embodiments, the sol-gel of the one or more sol-gel vaults is a silica-based sol-gel. In some embodiments, the one or more enzymes are mINT passenger molecules. In some embodiments, the one or more enzymes are passively packaged passenger molecules. In some embodiments, the one or more sol-gel vaults is in the form of a sol-gel vault nanocomposite. In some embodiments, the enzymatic compositions are used to enzymatically treat a given sample. In some embodiments, the enzymatic compositions are reused to enzymatically treat another sample. In some embodiments, the enzymatic compositions are reused multiple times, e.g., up to about 30 times. In some embodiments, sol-gel vaults comprising mINT passenger molecules exhibit at least about 95%, about 96%, about 97%, about 98%, about 99%, or about 100% activity after at least about 10 reuses.

Figure 14:
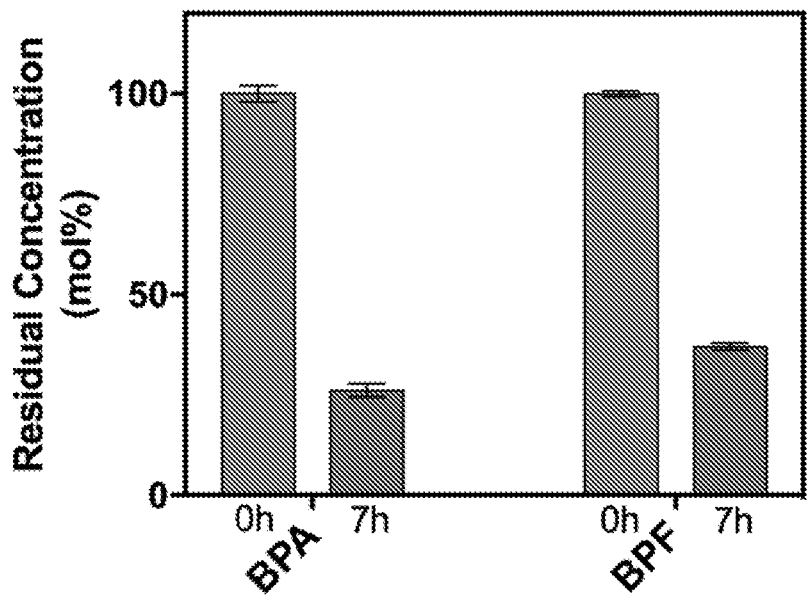
FIG. 14 to FIG. 15: Decontamination of bisphenols from water by sol-gel vaults (MnP-INT/vault/MSN).
Figure 15:
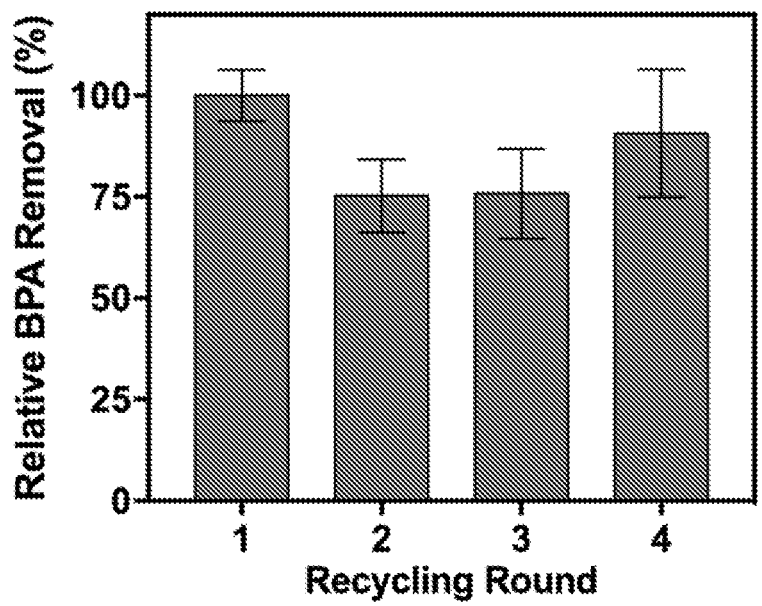
Figure 16:
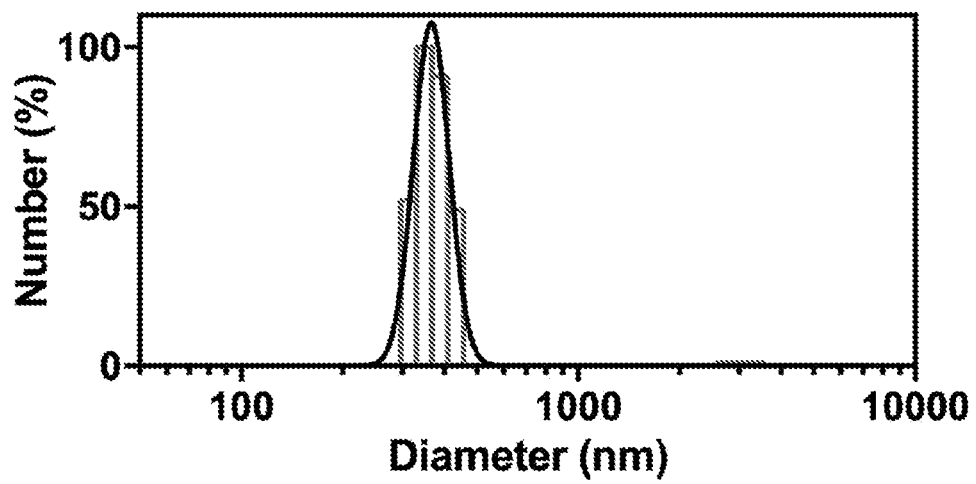
FIG. 16: Hydrodynamic diameter distribution of sol-gel vault nanocomposites. The average diameter was measured around 400 nm.
Figure 24:
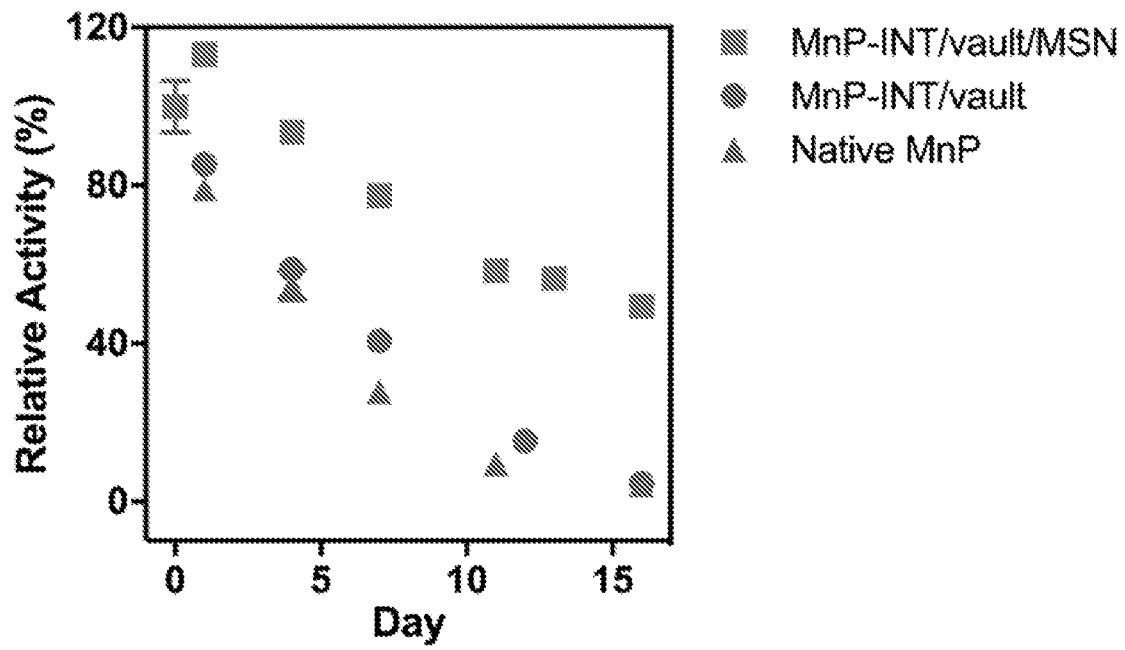
FIG. 24 to FIG. 25: Enhanced stability of manganese peroxidase (MnP) encapsulated in sol-gel vaults in real water samples.
Figure 25:
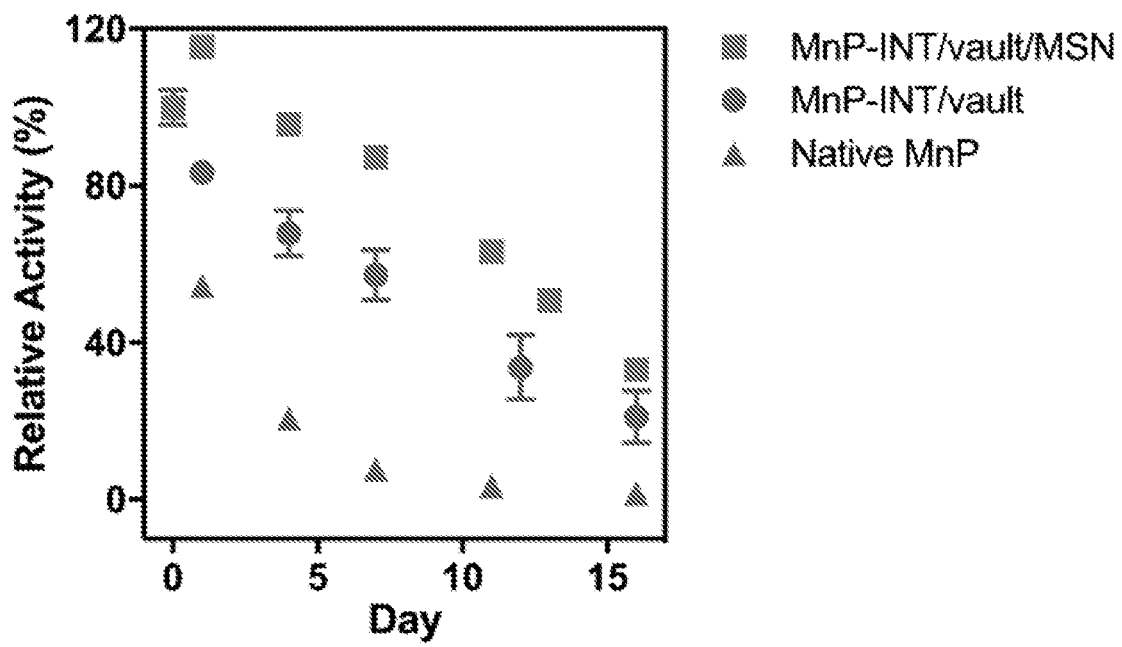

Bisphenolic compounds are common estrogenic contaminants in water systems, which cause adverse health effects and reproductive toxicities. MnP-INT/vault/MSNs were found to effectively remove bisphenol A (BPA) and bisphenol F (BPF) (FIG. 14). On reusability, MnP-INT/vault/MSNs maintained robust activity after reuses, and showed no obvious decrease in BPA removal in four recycling rounds (FIG. 15). In actual enzymatic water treatment, enzymes are not used in buffered conditions. Therefore, the activity and stability of MnP-INT/vault/MSNs was tested in tap water and groundwater. As shown in FIG. 24, after 16 days incubation in tap water at 15° C., MnP-INT immobilized in sol-gel vaults maintained 50% of its initial activity, while no significant activity was detected for MnP-INT/vaults or free MnP. In groundwater, the residual activity percentage of the MnP-INT/vault/MSNs after 16 days incubation was more than 10 times higher than that of free MnP (FIG. 25).

Therefore, in some embodiments, the present invention is directed methods of removing phenolics, aromatic hydrocarbons, and/or azo dyes from a liquid, such as water, which comprises contacting one or more sol-gel vaults having MnP as a passenger molecule. In some embodiments, the sol-gel of the one or more sol-gel vaults is a silica-based sol-gel. In some embodiments, the MnP is a mINT passenger molecule. In some embodiments, the MnP is a passively packaged passenger molecule. In some embodiments, the one or more sol-gel vaults is in the form of a sol-gel vault nanocomposite. In some embodiments, the one or more sol-gel vaults are reused to remove phenolics, aromatic hydrocarbons, and/or azo dyes from another liquid sample. In some embodiments, the one or more sol-gel vaults are reused multiple times, e.g., up to about 30 times. In some embodiments, the sol-gel vaults containing one or more enzymes encapsulated therein are subjected to a washing step to, for example, remove solid contaminants that may prevent the liquid to be treated from coming into contact with the one or more enzymes.

Some enzymes are known to become inactivated, e.g., by their substrates. Therefore, in some embodiments, the methods further include the sol-gel vaults become inactivated by their substrates, the methods may further include a step of reactivating the enzymes. For example, where the enzyme encapsulated in a sol-gel vault is a cholinesterase that has become inactivated by an organophosphorus compound, the cholinesterase may be reactivated by contacting the sol-gel vault with an oxime.

Applications

The activity yields of the sol-gel vaults exemplified herein are comparable or better than that reported for prior art nanocomposites such as single-enzyme nanoparticles, nanogels, and protein-embedded metal-organic frameworks. Therefore, the sol-gel vaults and sol-gel vault nanocomposites (modified to have the same protein as the given prior art nanocomposite) may be used in the same applications as other nanocomposites in the art.

Additionally, because prior art nanocomposites exhibit significant protein leakage and loss of activity, e.g., laccase nanoflowers lost near 20% activity in the detection of epinephrine after 5 reuses, lipase immobilized on modified MSNs lost 7-74% activity after 5 reuses, amine-based silica entrapped carbon anhydrase exhibited 10% leakage in 24 hours a loss of 13% activity after 5 reuses, the sol-gel vaults and sol-gel vault nanocomposites (modified to have the same protein as the given prior art nanocomposite) can be used in smaller amounts and provide the same results or used in the same amounts as the prior art nanocomposites to provide superior results (e.g., greater activity).

In some embodiments, sol-gel vaults and sol-gel vault nanocomposites comprising one or more therapeutic or diagnostic agents as passenger molecules may be used in a variety of diagnostic, cell targeting, and drug loading and delivery applications such as those described in Owens, et al. (2016) Progress in Materials Science 77: 1-79. For example, because mesoporous silica is slowly degraded in vivo into silica the passenger molecules in the sol-gel vaults will be slowly released. Thus, sol-gel vaults and sol-gel vault nanocomposites may be used for slow- and controlled-release of therapeutic or diagnostic agents. Sol-gel vaults and sol-gel vault nanocomposites comprising therapeutic enzymes may be used in cancer therapies, and to treat enzyme deficiencies in subjects suffering from diseases like Gaucher disease, Fabry disease, MPS I, MPS II (Hunter syndrome), MPS VI, and Pompe disease and treat subjects having adenosine deaminase deficiencies from severe combined immunodeficiency (SCID). Sol-gel vaults and sol-gel vault nanocomposites comprising enzymes that counteract, degrade, or inactivate toxins may be administered to subjects to counteract, degrade, or inactivate toxins in vivo. In some embodiments, sol-gel vaults and sol-gel vault nanocomposites may be used as scaffolds and matrices for tissue repair and/or regeneration. The sol-gel vaults may comprise therapeutic agents, e.g., growth hormones, as passenger molecules and/or one or more therapeutic agents may be directly immobilized in the matrix of the sol-gel itself (without being encapsulated within vault particles).

In some embodiments, sol-gel vaults and sol-gel vault nanocomposites may be used in a variety of industrial applications including industrial biofuel synthesis, food and beverage processing, pharmaceutical manufacturing, biological and chemical detection, and environmental remediation. For example, sol-gel vaults and sol-gel vault nanocomposites comprising enzymes useful for stain removal and sanitation as passenger molecules may be used in a variety detergents such as dishwashing detergents, laundry detergents, and other cleaning detergents. Sol-gel vaults and sol-gel vault nanocomposites comprising biomolecules, such as enzymes, useful in counteracting, degrading, or inactivating contaminants as passenger molecules may be used to treat contaminants in water (e.g., drinking water or ground water) and in soil.

In some embodiments, sol-gel vaults and sol-gel vault nanocomposites may be used in and/or on sensor devices, fibers, thin films, fine powders, and monolithic substrates. For example, sol-gel vaults and sol-gel vault nanocomposites may used in various applications as are other sol-gels in the art, e.g., protective coatings, catalysts, piezoelectric devices, wave-guides, lenses, high-strength ceramics, superconductors, synthesis of nanoparticles and insulating materials.

As used herein, the terms "vault" and "vault particle" are used interchangeably to refer to a ribonucleoprotein (RNP) comprising complexes of MVPs, alone or in combination with VPARP proteins and/or TEP1 proteins. Vault particles can be naturally occurring or synthetically made. As used herein, "recombinant vaults", "engineered vaults", "recombinant vault particles", and "engineered vault particles" are used interchangeably to refer to vaults that have been synthesized using laboratory techniques, e.g., recombinant methods, as opposed to naturally occurring vaults. In some embodiments, recombinant vaults have a barrel-like shape that is the same as or substantially similar to naturally occurring vaults.

In some embodiments, the present invention is directed to sol-gel vaults and compositions thereof. As used herein, the term "sol-gel vault" refers to a vault particle complexed with a sol-gel. Sol-gel vaults may include one or more passenger molecules. The passenger molecules may be carried on the outer surface of the sol-gel vault and/or packaged within the cavity of the sol-gel vault. As provided herein, sol-gel vaults comprising passenger molecules are named according to their passenger molecule followed by "/vault/MSN". For example, "MnP-INT/vault/MSN" refers to a sol-gel vault comprising MnP-INT as a passenger molecule.

As provided herein, a sol-gel comprising a free protein, e.g., free MnP or free mCherry, that is not packaged within a vault particle before formation of the sol-gel using the vault particle as a templating agent is referenced by the protein (without "-INT") followed by "/vault/MSN", e.g., MnP/vault/MSN and mCherry/vault/MSN.

In some embodiments, the present invention is directed to sol-gel vault nanocomposites and compositions thereof. As used herein, the term "sol-gel vault nanocomposite" refers to an aggregate of a plurality of sol-gel vaults, which sol-gel vaults may be the same or different. Sol-gel vault nanocomposites may include one or more passenger molecules. The passenger molecules may be provided on the outer surface of one or more sol-gel vaults, packaged within the cavity of one or more sol-gel vaults, and/or immobilized in the sol-gel itself. In some preferred embodiments, passenger molecules are packaged within the cavities of sol-gel vaults. In some preferred embodiments, the passenger molecules are packaged within the cavities of sol-gel vaults by mINT fusion packaging.

Unless indicated otherwise, the use of "one or more sol-gel vaults" or "a plurality of sol-gel vaults" may refer to a sol-gel vault nanocomposite or more than one sol-gel vaults that are not linked together by a sol-gel matrix.

As used herein, a "sol-gel" refers to a three-dimensional matrix containing both a liquid phase and a solid phase. Sol-gels may be made using any sol-gel process and sol-gel materials in the art. See, e.g., Owens, et al. (2016) Progress in Materials Science 77: 1-79, which is herein incorporated by reference in its entirety. In some embodiments, the sol-gel is a "silica-based sol-gel", i.e., formed of silica-based materials. In some embodiments, the sol-gel is formed of phosphate-based materials. In some embodiments, the sol-gel is formed of metal-based materials. In some embodiments, the sol-gel is formed of calcium phosphate-based materials. In some embodiments, the sol-gel is formed of organic and inorganic hybrid materials.

As used herein, a "naked vault" refers to a vault particle that is not complexed with a sol-gel. Naked vaults may comprise one or more passenger molecules. As provided herein, naked vaults comprising passenger molecules are named according to their passenger molecules followed by "/vault". For example, "MnP-INT/vault" refers to a naked vault comprising MnP-INT as a passenger molecule. Naked vaults may be used to make sol-gel vaults, e.g., as templating agents.

Although the methods exemplified herein employ vault particles to induce sol-gel formation/silica precipitation, other sol-gel methods in the art may be used to form sol-gel vaults. That is, formation of the sol-gel matrix may be initiated using other sol-gel chemistries and methods in the art. See, e.g., Danks, et al. (2016) Mater. Horiz. 3: 91-112, which is herein incorporated by reference in its entirety. For example, vault particles may be added to an aqueous solution of metal salts and polyvinyl alcohol (PVA) and then heated to form a sol-gel vault nanocomposite, i.e., vault particles immobilized within a PVA sol-gel matrix. As another example, sol-gel vaults may be made by applying a sol-gel precursor solution that has begun to polymerize to vault particles, e.g., as a coating thereon.

As used herein, a "major vault protein (MVP)" refers to a protein that has at least about 85%, preferably about 90-100%, more preferably about 95-100%, and most preferably 97-100% sequence identity to a major vault protein and can form a part of a vault. Examples of major vault proteins are provided in the NCBI protein database (available on the Internet, ncbi.nlm.nih.gov/protein) and include GI: 41055865 ("rat MVP", NP_073206.2), GI: 239052674 ("mouse MVP", NP_542369.2), and GI: 15990478 (human, AAH15623.1, herein referred to as "human MVP" or "hMVP"). In some embodiments, the MVP has at least about 85%, preferably about 90-100%, more preferably about 95-100%, and most preferably 97-100% sequence identity to human MVP. In some embodiments, the MVP has 85%, 86%, 87%, 88%, 89%, 90%, 91%, 92%, 93%, 94%, 95%, 96%, 97%, 98%, 99% or 100% sequence identity to human MVP. In some embodiments, the MVP has at least about 85%, preferably about 90-100%, more preferably about 95-100%, and most preferably 97-100% sequence identity to rat MVP. In some embodiments, the MVP has 85%, 86%, 87%, 88%, 89%, 90%, 91%, 92%, 93%, 94%, 95%, 96%, 97%, 98%, 99% or 100% sequence identity to rat MVP. In some embodiments, the MVP has at least about 85%, preferably about 90-100%, more preferably about 95-100%, and most preferably 97-100% sequence identity to mouse MVP. In some embodiments, the MVP has 85%, 86%, 87%, 88%, 89%, 90%, 91%, 92%, 93%, 94%, 95%, 96%, 97%, 98%, 99% or 100% sequence identity to mouse MVP. MVPs can be synthetic, mutated, modified, human, animal (e.g., rat MVP), etc. In some embodiments, the MVP is an analog of human MVP. In some embodiments, the MVP is a homolog of human MVP. As used herein, "analogs" refer to proteins (or nucleic acid molecules) of heterologous origins that display the same or substantially similar activity. As used herein, "homologs" refer to proteins (or nucleic acid molecules) of a common origin, but do not necessarily exhibit the same or substantially similar activity.

As used herein, a "VPARP protein" refers to a protein that has at least about 85%, preferably about 90-100%, more preferably about 95-100%, and most preferably 97-100% sequence identity to a vault poly ADP-ribose polymerase and can form a part of a vault. Examples of VPARP proteins are provided in the NCBI protein database (available on the Internet, ncbi.nlm.nih.gov/protein) and include GI: 149064059 (rat, EDM14329.1), GI: 281485553 (mouse, NP_001139450.2), and GI: 112789550 (human, NP_006428.2). In some embodiments, the VPARP protein has at least about 85%, preferably about 90-100%, more preferably about 95-100%, and most preferably 97-100% sequence identity to human VPARP protein. In some embodiments, the VPARP protein has at least about 85%, preferably about 90-100%, more preferably about 95-100%, and most preferably 97-100% sequence identity to rat VPARP protein. In some embodiments, the VPARP protein has at least about 85%, preferably about 90-100%, more preferably about 95-100%, and most preferably 97-100% sequence identity to mouse VPARP protein. VPARP proteins can be synthetic, mutated, modified, human, animal (e.g., rat VPARP protein), etc. In some embodiments, the VPARP protein is an analog of human VPARP protein. In some embodiments, the VPARP protein is a homolog of human VPARP protein.

As used herein, "mINT sequence" is used interchangeably with "INT" to refer to the major vault protein interaction domain of a given VPARP protein.

As used herein, a "TEP1 protein" refers to a protein that has 90-100%, preferably 95-100%, sequence identity to a telomerase/vault associated protein 1 and can form a part of a vault. Examples of TEP1 proteins are provided in the NCBI protein database (available on the Internet, ncbi.nlm.nih.gov/protein) and include GI: 12018250 (rat, NP_072113.1), GI: 6678285 (mouse, NP_033377.1), and GI: 21536371 (human, NP_009041.2). TEP1 proteins can be synthetic, mutated, modified, human, animal (e.g., rat TEP1), etc.

As used herein, "passenger molecules" refer to molecules of interest that are carried on the surface of vault particles, molecules enclosed in vault particles (e.g., when vault particles are fully closed), molecules contained within the cavities of vault particles (e.g., when vault particles have openings or are partially formed), and molecules incorporated in the structures of vaults (e.g., covalently attached to the MVPs of vaults). In some embodiments, the passenger molecule is a protein (or fragment thereof), which is referred to herein as a "passenger peptide" or "passenger protein". In some embodiments, the passenger molecule is heterologous to its carrier molecule (e.g., heterologous to the vault particle containing the passenger molecule, heterologous to the mINT sequence or MVP that the passenger molecule is covalently attached to, etc.). In some embodiments, the passenger molecule is covalently linked to its carrier molecule using methods, e.g., recombinant techniques, in the art. In some embodiments, the passenger molecule is covalently linked to its carrier molecule using a linker, e.g., a flexible amino acid linker, in the art.

As used herein, an "mINT passenger molecule" refers to a passenger molecule that is covalently linked to an mINT sequence. As provided herein, mINT passenger molecules are named according to the given passenger molecule followed by "—INT". For example, "MnP-INT" refers to an mINT passenger molecule where the passenger molecule is manganese peroxidase (MnP). A passively packaged passenger molecule is not covalently attached to INT. Therefore, a vault particle comprising a passively packaged passenger molecule lacks the "-INT" notation. For example, "MnP/vault" refers to a naked vault comprising passively packaged MnP and "MnP/vault/MSN" refers to a sol-gel vault comprising passively packaged MnP.

As used herein, an "N-linked passenger molecule" refers to a passenger molecule that is covalently linked to the N-terminus of an MVP.

As used herein, an "C-linked passenger molecule" refers to a passenger molecule that is covalently linked to the C-terminus of an MVP.

As used herein, "mINT fusion packaging" refers to a method where one or more mINT passenger molecules are mixed with formed vaults to thereby package the fusion molecules in the interior cavities of vaults (e.g., US 20120213809).

As used herein, "passive packaging" refers to a method where one or more passenger molecules are mixed with MVPs as they are being folded into vault structures having an interior cavity (e.g., WO 2016/049122). As used herein, "passively packaged passenger molecules" refer to a passenger molecule that has been packaged in the interior cavity of a vault particle by passive packaging.

As used herein, a given percentage of "sequence identity" refers to the percentage of nucleotides or amino acid residues that are the same between sequences, when compared and optimally aligned for maximum correspondence over a given comparison window, as measured by visual inspection or by a sequence comparison algorithm in the art, such as the BLAST algorithm, which is described in Altschul et al., J. Mol. Biol. 215:403-410 (1990). Software for performing BLAST (e.g., BLASTP and BLASTN) analyses is publicly available through the National Center for Biotechnology Information (ncbi.nlm.nih.gov). The comparison window can exist over a given portion, e.g., a functional domain, or an arbitrarily selection a given number of contiguous nucleotides or amino acid residues of one or both sequences. Alternatively, the comparison window can exist over the full length of the sequences being compared. For purposes herein, where a given comparison window (e.g., over 80% of the given sequence) is not provided, the recited sequence identity is over 100% of the given sequence. Additionally, for the percentages of sequence identity of proteins provided herein, the percentages are determined using BLASTP 2.8.0+, scoring matrix BLOSUM62, and the default parameters available at blast.ncbi.nlm.nih.gov/Blast.cgi. See also Altschul, et al. (1997), Nucleic Acids Res. 25:3389-3402; and Altschul, et al. (2005) FEBS J. 272:5101-5109.

Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, PNAS USA 85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by visual inspection.

As used herein, the terms "protein", "polypeptide" and "peptide" are used interchangeably to refer to two or more amino acids linked together. Groups or strings of amino acid abbreviations are used to represent peptides. Except when specifically indicated, peptides are indicated with the N-terminus on the left and the sequence is written from the N-terminus to the C-terminus.

As used herein, an "isolated" compound refers to a compound that is isolated from its native environment. For example, an isolated polynucleotide is one that does not have the bases normally flanking the 5' end and/or the 3' end of the polynucleotide as it is found in nature. As another example, an isolated polypeptide is one that does not have its native amino acids, which correspond to the full-length polypeptide, flanking the N-terminus, C-terminus, or both.

In some embodiments, the sol-gel vaults are substantially purified. As used herein, a "substantially purified" compound refers to a compound that is removed from its natural environment and/or is at least about 60% free, preferably about 75% free, and more preferably about 90% free, and most preferably about 95-100% free from other macromolecular components or compounds with which the compound is associated with in nature or from its synthesis.

Compositions, including pharmaceutical compositions and vaccines, comprising, consists essentially of, or consisting of one or more sol-gel vaults is contemplated herein. As used herein, the phrase "consists essentially of" in the context of, e.g., sol-gel vaults, means that the composition may comprise other ingredients, but does not comprise vault particles that are not sol-gel vaults.

The term "pharmaceutical composition" refers to a composition suitable for pharmaceutical use in a subject. A pharmaceutical composition comprises one or more sol-gel vaults and a pharmaceutically acceptable carrier. In some embodiments, the pharmaceutical composition comprise an effective amount of the one or more sol-gel vaults. The term "effective amount" refers to a dosage or amount sufficient to produce a desired result. The desired result may comprise an objective or subjective improvement in the recipient of the dosage or amount, e.g., long-term survival, effective prevention of a disease state, and the like.

One or more sol-gel vaults according to the present invention may be administered, preferably in the form of pharmaceutical compositions, to a subject. Preferably the subject is mammalian, more preferably, the subject is human. Preferred pharmaceutical compositions are those comprising at least one sol-gel vault in a therapeutically effective amount or an immunogenic amount, and a pharmaceutically acceptable vehicle.

Vaccines according to the present invention provide a protective immune response when administered to a subject. As used herein, a "vaccine" according to the present invention is a pharmaceutical composition that comprises an immunogenic amount of at least one sol-gel vault and provides a protective immune response when administered to a subject. The protective immune response may be complete or partial, e.g., a reduction in symptoms as compared with an unvaccinated subject.

As used herein, an "immunogenic amount" is an amount that is sufficient to elicit an immune response in a subject and depends on a variety of factors such as the immunogenicity of the given sol-gel vault, the manner of administration, the general state of health of the subject, and the like. The typical immunogenic amounts for initial and boosting immunizations for therapeutic or prophylactic administration may range from about 120 µg to 8 mg per kilogram of body weight of a subject. For example, the typical immunogenic amount for initial and boosting immunization for therapeutic or prophylactic administration for a human subject of 70 kg body weight ranges from about 8.4 mg to about 560 mg, preferably about 10-100 mg, more preferably about 10-20 mg, per about 65-70 kg body weight of a subject. Examples of suitable immunization protocols include an initial immunization injection (time 0), followed by booster injections at 4, and/or 8 weeks, which these initial immunization injections may be followed by further booster injections at 1 or 2 years if needed.

As used herein, a "therapeutically effective amount" refers to an amount that may be used to treat, prevent, or inhibit a given disease or condition in a subject as compared to a control. Again, the skilled artisan will appreciate that certain factors may influence the amount required to effectively treat a subject, including the given disease or disorder and degree thereof, previous treatments, the general health and age of the subject, and the like. Nevertheless, therapeutically effective amounts may be readily determined by methods in the art. It should be noted that treatment of a subject with a therapeutically effective amount or an immunogenic amount may be administered as a single dose or as a series of several doses. The dosages used for treatment may increase or decrease over the course of a given treatment. Optimal dosages for a given set of conditions may be ascertained by those skilled in the art using dosage-determination tests and/or diagnostic assays in the art. Dosage-determination tests and/or diagnostic assays may be used to monitor and adjust dosages during the course of treatment.

The compositions of the present invention may include an adjuvant. As used herein, an "adjuvant" refers to any substance which, when administered in conjunction with (e.g., before, during, or after) a pharmaceutically active agent, such as a sol-gel vault according to the present invention, aids the pharmaceutically active agent in its mechanism of action. Thus, an adjuvant in a vaccine according to the present invention is a substance that aids the at least one sol-gel vault in eliciting an immune response. Suitable adjuvants include incomplete Freund's adjuvant, alum, aluminum phosphate, aluminum hydroxide, N-acetyl-muramyl-L-threonyl-D-isoglutamine (thr-MDP), N-acetyl-nor-muramyl-L-alanyl-D-isoglutamine (CGP 11637, nor-MDP), N-acetylmuramyl-Lalanyl-D-isoglutaminyl-L-alanine-2-(1'-2'-dipa-lmitoyl-sn-glycero-3-hydroxyphosphoryloxy)-ethylamine (CGP 19835A, MTP-PE), and RIBI, which comprise three components extracted from bacteria, monophosphoryl lipid A, trehalose dimycolate and cell wall skeleton (NPL+TDM+CWS) in a 2% squalene/Tween 80 emulsion. The effectiveness of an adjuvant may be determined by methods in the art.

Pharmaceutical compositions of the present invention may be formulated for the intended route of delivery, including intravenous, intramuscular, intra peritoneal, subcutaneous, intraocular, intrathecal, intraarticular, intrasynovial, cisternal, intrahepatic, intralesional injection, intracranial injection, infusion, and/or inhaled routes of administration using methods known in the art. Pharmaceutical compositions according to the present invention may include one or more of the following: pH buffered solutions, adjuvants (e.g., preservatives, wetting agents, emulsifying agents, and dispersing agents), liposomal formulations, nanoparticles, dispersions, suspensions, or emulsions, as well as sterile powders for reconstitution into sterile injectable solutions or dispersions. The compositions and formulations of the present invention may be optimized for increased stability and efficacy using methods in the art. See, e.g., Carra et al. (2007) Vaccine 25:4149-4158.

The compositions of the present invention may be administered to a subject by any suitable route including oral, transdermal, subcutaneous, intranasal, inhalation, intramuscular, and intravascular administration. It will be appreciated that the preferred route of administration and pharmaceutical formulation will vary with the condition and age of the subject, the nature of the condition to be treated, the therapeutic effect desired, and the particular sol-gel vault used.

As used herein, a "pharmaceutically acceptable vehicle" or "pharmaceutically acceptable carrier" are used interchangeably and refer to solvents, dispersion media, coatings, antibacterial and antifungal agents, isotonic and absorption delaying agents, and the like, that are compatible with pharmaceutical administration and comply with the applicable standards and regulations, e.g., the pharmacopeial standards set forth in the United States Pharmacopeia and the National Formulary (USP-NF) book, for pharmaceutical administration. Thus, for example, unsterile water is excluded as a pharmaceutically acceptable carrier for, at least, intravenous administration. Pharmaceutically acceptable vehicles include those known in the art. See, e.g., REMINGTON: THE SCIENCE AND PRACTICE OF PHARMACY. $20^{th}$ ed. (2000) Lippincott Williams & Wilkins. Baltimore, MD, which is herein incorporated by reference.

The pharmaceutical compositions of the present invention may be provided in dosage unit forms. As used herein, a "dosage unit form" refers to physically discrete units suited as unitary dosages for the subject to be treated; each unit containing a predetermined quantity of the one or more sol-gel vault calculated to produce the desired therapeutic effect in association with the required pharmaceutically acceptable carrier. The specification for the dosage unit forms of the invention are dictated by and directly dependent on the unique characteristics of the given sol-gel vault and desired therapeutic effect to be achieved, and the limitations inherent in the art of compounding such an active compound for the treatment of individuals.

Toxicity and therapeutic efficacy of sol-gel vaults according to the instant invention and compositions thereof can be determined using cell cultures and/or experimental animals and pharmaceutical procedures in the art. For example, one may determine the lethal dose, $LC_{50}$ (the dose expressed as concentration x exposure time that is lethal to 50% of the population) or the $LD_{50}$ (the dose lethal to 50% of the population), and the $ED_{50}$ (the dose therapeutically effective in 50% of the population) by methods in the art. The dose ratio between toxic and therapeutic effects is the therapeutic index and it can be expressed as the ratio $LD_{50}/ED_{50}$. Sol-gel vaults which exhibit large therapeutic indices are preferred. While sol-gel vaults that result in toxic side-effects may be used, care should be taken to design a delivery system that targets such compounds to the site of treatment to minimize potential damage to uninfected cells and, thereby, reduce side-effects.

The data obtained from the cell culture assays and animal studies can be used in formulating a range of dosages for use in humans. Preferred dosages provide a range of circulating concentrations that include the $ED_{50}$ with little or no toxicity. The dosage may vary depending upon the dosage form employed and the route of administration utilized. Therapeutically effective amounts and dosages of one or more sol-gel vaults according to the present invention can be estimated initially from cell culture assays. A dose may be formulated in animal models to achieve a circulating plasma concentration range that includes the $IC_{50}$ (i.e., the concentration of the test compound which achieves a half-maximal inhibition of symptoms) as determined in cell culture. Such information can be used to more accurately determine useful doses in humans. Levels in plasma may be measured, for example, by high performance liquid chromatography. Additionally, a dosage suitable for a given subject can be determined by an attending physician or qualified medical practitioner, based on various clinical factors.

In some embodiments, the present invention is directed to kits which comprise one or more sol-gel vaults, optionally in a composition, packaged together with one or more reagents or drug delivery devices for preventing, inhibiting, reducing, or treating a given disease or disorder in a subject. Such kits include a carrier, package, or container that may be compartmentalized to receive one or more containers, such as vials, tubes, and the like. In some embodiments, the kits optionally include an identifying description or label or instructions relating to its use. In some embodiments, the kits comprise the one or more sol-gel vaults, optionally in one or more unit dosage forms, packaged together as a pack and/or in drug delivery device, e.g., a pre-filled syringe. In some embodiments, the kits include information prescribed by a governmental agency that regulates the manufacture, use, or sale of compounds and compositions according to the present invention.

The following examples are intended to illustrate but not to limit the invention.

Material and Methods

Tetramethyl orthosilicate (TMOS) and other commercial reagents were purchased from Fisher Scientific or Sigma-Aldrich. Recombinant vaults were purified from Sf9 insect cells expressing human MVP. mCherry, mCherry-INT, GL, GL-INT, and MnP-INT were expressed in *E. coli* or Sf9 insect cells. Native MnP was extracted and purified from white-rot fungus *Phanerochaete chrysosporium* using methods in the art. Naked vaults comprising mCherry-INT, GL-INT, and MnP-INT were prepared using methods in the art. Protein concentrations were determined using the bicinchoninic acid (BCA) assay (Thermo Fisher Scientific).

Preparation of Sol-Gel Vaults with or without Encapsulated Proteins

Pre-hydrolyzed TMOS was prepared using a mixture containing 807 μL TMOS, 181.6 μL deionized water, and 7.6 μL 0.04 N HCl. The mixture was stirred in an ice bath for 10 minutes, followed by 20 minutes sonication at 0° C. The resultant TMOS sol was kept on ice before use. To prepare sol-gel vaults, a mixture containing 500 μL pH 5.5 50 mM malonate-Na buffer, 17 μL vault solution (3-4 mg naked vaults per mL of water) and 17 μL TMOS or pre-hydrolyzed TMOS was stirred at 4° C. for 1 hour. The resultant sol-gel vaults were collected by 10 minutes centrifugation at 6000× g, and then washed three times with deionized water. The particle size distribution was measured using NanoBrook ZetaPALS Potential Analyzer.

To test the relationship between applied vaults and precipitated silica, different amounts of vaults to the TMOS prior to analysis. For the evaluation of pH effects on sol-gel vault formation, 50 mM citrate-phosphate buffer at pH 5.5, 6, 6.5, 7, and 7.5 were used. mCherry-INT/vault/MSNs, GL-INT/vault/MSNs, and MnP-INT/vault/MSNs were prepared by the same procedure described above, but using mCherry-INT/vault, GL-INT/vault, and MnP-INT/vault as templating agents, respectively. After washing with deionized water, mCherry-INT/vault/MSNs and GFP-INT/vault/MSNs were stored in Buffer A (50 mM Tris pH 7.4, 75 mM NaCl, 0.5 mM $MgCl_2$), and MnP-INT/vault/MSNs was stored in pH 5.0 50 mM malonate-Na buffer at 4° C.

To test the immobilization of unencapsulated proteins in sol-gel vaults, free mCherry or free MnP was added to the mixture containing 500 μL pH 5.5 50 mM malonate-Na buffer, 17 μL vault solution (3-4 mg/mL) and 17 μL pre-hydrolyzed TMOS, followed by a 1 hour stir at 4° C., centrifugation and washing. The yield was calculated by dividing the bioactivity or enzymatic activity of mesosilica by initially applied activity.

Silica Quantification

Washed sol-gel vaults were resuspended in 50 μL 1 N NaOH, and heated at 95° C. for 30 minutes to dissolve silica. Then, concentrations of dissolved silica were determined colorimetrically by the silicomolybdate method using EMD Millipore silicate test kit with a modified protocol. In brief, 860 μL diluted silica sample in 0.5 N NaOH was mixed with 30 μL Reagent Si-1, followed by adding 140 μL 4 N $H_2SO_4$. The reaction was then kept at room temperature for 10 minutes. Silica concentration was determined by measuring the resultant yellow silicomolybdayte absorbance at 354 nm.

Fluorescence Intensity Measurement

Activity of free and encapsulated mCherry and GL were measured in 96-well plates with black wall and black bottom. Fluorescence intensities were measured using Perkin Elmer VICTOR 1420 Multilabel Counter with emission filter above the sample. The excitation/emission wavelengths for mCherry and GL were 560 nm/615 nm and 485 nm/520 nm, respectively.

mCherry-INT/Vault/MSN Leakage

The mCherry-INT/vault/MSN was maintained at 4° C. for 47 days. On day 0, 15 μL fluorescent MSN sample was diluted to 200 μL with 185 μL Buffer A, and measured as the initial total fluorescence intensity. After centrifuging the mixture at 13,000×g for 10 minutes, fluorescence intensity of the supernatant was also measured to determine initial protein leaching. At each time point, 15 μL fluorescent MSN sample was combined with 185 μL Buffer A, and centrifuged at 6000-13000×g for 10 minutes. Fluorescence intensities of the supernatant and resuspended pellet (200 μL in Buffer A) were recorded to examine protein leakage.

GL-INT Stability Test

Unencapsulated GL-INT, GL-INT/vaults, and GL-INT/vault/MSNs were diluted to the same initial fluorescence before each test. To determine thermal stability, samples were incubated at 37° C. in 96-well plates for a given period. At each time point, fluorescence intensities were recorded and normalized to the initial measurements. To determine the stability against SDS denaturation, samples were incubated at room temperature in a solution containing 0.05% SDS, and measured at approximately ten-minute intervals. The fluorescence intensity readings before adding SDS were set as 100%.

MnP Enzyme Activity Assay

MnP activity was measured as the activity in catalyzing oxidation of ABTS. The assay was performed in pH 4.0 in 50 mM malonate-Na buffer containing 60 μM ABTS, 1.5 mM $MnCl_2$ and 30 μM $H_2O_2$ for 15 minutes at room temperature, and the enzyme activity was determined by measuring the product absorbance at 420 nm. Experiments evaluating enzyme stability and reusability were all performed using this assay.

Enzyme Stability Assay

Enzyme stability was evaluated under the following five conditions: (i) 10 minutes incubation in solution containing 15% methanol or isopropanol at room temperature; (ii) 30 minutes incubation at 35° C., 40° C., 45° C. or 50° C.; (iii) 10 minutes incubation at 45° C. in solution containing 5%, 10% or 15% methanol; (iv) 16 days incubation in tap water at 15° C. (v) 16 days incubation 15° C. in groundwater collected from the field. For each sample collected, enzyme activity was measured following the assay described above, and normalized to its corresponding initial activity.

Enzyme Reusability

ABTS was used as the model substrate to determine the reusability of sol-gel vaults immobilized MnP enzymes. Following the procedures described above, absorbance at 420 nm of the assay solution was immediately measured after 15 minutes reaction. The solution was then centrifuged at 6000×g for 5 minutes, followed supernatant removal. This step was repeated once to remove as much liquid as possible. The final pellet was recycled and subjected to the next use. Absorbance determined after each use was normalized to the first measurement. The supernatant after the first use was also kept for an extra 35 minutes to examine if there was any enzyme leaching caused absorbance increase.

Removal of Bisphenolic Compounds

BPA and BPF removal was performed in pH 4.0 50 mM malonate buffer containing 1.5 mM $MnCl_2$, 60 μM BPA or BPF, 30 μM $H_2O_2$, 2 g/L polyethylene glycol (PEG, M.W. 8000) and MnP-INT/vault/MSNs, at 25° C. At each time point, triplicate samples were centrifuged at 6000×g for 5 minutes. The supernatant was collected and mixed with equal volumes of methanol to quench the reactions. To test the reusability of MnP-INT/vault/MSNs in removing BPA, reactions were maintained for 35 minutes at 25° C. The MnP-INT/vault/MSN was recycled by centrifuging at 6000×g for 5 minutes, followed by washing with 100 μL pH 4.0 50 mM malonate buffer with 2 g/L PEG. Residual BPA and BPF concentrations were determined using a Hewlett Packard high-performance liquid chromatograph (HP 1050 HPLC system) equipped with an Agilent Eclipse Plus C18 column (4.6×150 mm, 5 μm particle size) and a UV detector at 277 nm. The mobile phase used was a mixture of methanol-water (70:30, v/v), and was run at 0.5 mL/min.

The following references are herein incorporated in their entirety:

Afonina, Z. A., Myasnikov, A. G., Shirokov, V. A., Klaholz, B. P., Spirin, A. S., 2014. Conformation transitions of eukaryotic polyribosomes during multi-round translation. Nucleic Acids Res. 43 (1), 618-628.

Aimé, C.; Coradin, T.; Fernandes, F. M. Biomimetic Sol-Gel Materials. In The Sol-Gel Handbook, Levy, D.; Zayat, r., Eds. Wiley-VCH Verlag GmbH & Co. KGaA: 2015; pp 605-650.

Aitken, M. D., Irvine, R. L., 1989. Stability testing of ligninase and Mn-peroxidase from *Phanerochaete chrysosporium*. Biotechnol. Bioeng. 34 (10), 1251-1260.

Andersen, D. C.; Krummen, L. Recombinant protein expression for therapeutic applications. Current Opinion in Biotechnology 2002, 13 (2), 117-123.

Baratelli, F.; Takedatsu, H.; Hazra, S.; Peebles, K.; Luo, J.; Kurimoto, P. S.; Zeng, G.; Batra, R. K.; Sharma, S.; Dubinett, S. M.; Lee, J. M. Pre-clinical Characterization of GMP Grade CCL21-Gene Modified Dendritic Cells for Application in a Phase I Trial in Non-Small Cell Lung Cancer. Journal of Translational Medicine 2008, 6.

Beck, J. S.; Vartuli, J. C.; Roth, W. J.; Leonowicz, M. E.; Kresge, C. T.; Schmitt, K. D.; Chu, C. T. W.; Olson, D. H.; Sheppard, E. W.; Mccullen, S. B.; Higgins, J. B.; Schlenker, J. L. A New Family of Mesoporous Molecular-Sieves Prepared with Liquid-Crystal Templates. Journal of the American Chemical Society 1992, 114, 10834-10843.

Benner, N. L.; Zang, X. Y.; Buehler, D. C.; Kickhoefer, V. A.; Rome, M. E.; Rome, L. H.; Wender, P. A. Vault Nanoparticles: Chemical Modifications for Imaging and Enhanced Delivery. Acs Nano 2017, 11, 872-881.

Berger, W., Steiner, E., Grusch, M., Elbling, L., Micksche, M., 2009. Vaults and the major vault protein: novel roles in signal pathway regulation and immunity. Cell. Mol. Life Sci. 66 (1), 43-61.

Brandes, H. K.; Hartman, F. C.; Lu, T. Y. S.; Larimer, F. W. Efficient expression of the gene for spinach phosphoribulokinase in *Pichia pastoris* and utilization of the recombinant enzyme to explore the role of regulatory cysteinyl residues by site-directed mutagenesis. Journal of Biological Chemistry 1996, 271 (11), 6490-6496.

Brandt, F., Carlson, L.-A., Hartl, F. U., Baumeister, W., Grunewald, K., 2010. The three-dimensional organization of polyribosomes in intact human cells. Mol. Cell 39, 560-569.

Buehler, D. C.; Toso, D. B.; Kickhoefer, V. A.; Zhou, Z. H.; Rome, L. H. Vaults Engineered for Hydrophobic Drug Delivery. Small 2011, 7, 1432-1439.

Byrne, M. P.; Smith, T. J.; Montgomery, V. A.; Smith, L. A. Purification, potency, and efficacy of the botulinum neurotoxin type A binding domain from *Pichia pastoris* as a recombinant vaccine candidate. Infection and Immunity 1998, 66 (10), 4817-4822.

Cha, J. N.; Stucky, G. D.; Morse, D. E.; Deming, T. J. Biomimetic synthesis of ordered silica structures mediated by block copolypeptides. Nature 2000, 403, 289-292.

Champion, C. I.; Kickhoefer, V. A.; Liu, G.; Moniz, R. J.; Freed, A. S.; Bergmann, L. L.; Vaccari, D.; Raval-Fernandes, S.; Chan, A. M.; Rome, L. H.; Kelly, K. A. A Vault Nanoparticle Vaccine Induces Protective Mucosal Immunity. PLoS ONE 2009, 4 (4).

Chen, Y. C., Shu, L., Qiu, Z. Q., Lee, D. Y., Settle, S. J., Hee, S. Q., Telesca, D., Yang, X., Allard, P., 2016. Exposure to the BPA-substitute bisphenol S causes unique alterations of germline function. PLoS Genet. 12 (7), e1006223.

Clare, J. J.; Rayment, F. B.; Ballantine, S. P.; Sreekrishna, K.; Romanos, M. A. High-Level Expression of Tetanus Toxin Fragment-C in *Pichia-pastoris* Strains Containing Multiple Tandem Integrations of the Gene. Bio-Technology 1991, 9 (5), 455-460.

Cregg, J. M.; Cereghino, J. L.; Shi, J. Y.; Higgins, D. R. Recombinant protein expression in *Pichia pastoris*. Molecular Biotechnology 2000, 16 (1), 23-52.

Dickerson, M. B.; Sandhage, K. H.; Naik, R. R. Protein- and Peptide-Directed Syntheses of Inorganic Materials. Chemical Reviews 2008, 108, 4935-4978.

Ding, K.; Zhang, X.; Mrazek, J.; Kickhoefer, V. A.; Lai, M.; Ng, H. L.; Yang, O. O.; Rome, L. H.; Zhou, Z. H. Solution Structures of Engineered Vault Particles. Structure 2018, 26, 619-+.

Eibes, G., Cajthaml, T., Moreira, M. T., Feijoo, G., Lema, J. M., 2006. Enzymatic degradation of anthracene, dibenzothiophene and pyrene by manganese peroxidase in media containing acetone. Chemosphere 64 (3), 408-414.

Esposito, A. M., Mateyak, M., He, D., Lewis, M., Sasikumar, A. N., Hutton, J., Copeland, P. R., Kinzy, T. G., 2010. Eukaryotic polyribosome profile analysis. J. Visualized Exp. (40), e1948.

Fahnestock, S. R.; Bedzyk, L. A. Production of synthetic spider dragline silk protein in *Pichia pastoris*. Applied Microbiology and Biotechnology 1997, 47 (1), 33-39.

Fernandez, J. M.; Hoeffler, J. P., Gene expression systems: using nature for the art of expression. Academic Press: 1998.

Forsyth, C.; Yip, T. W. S.; Patwardhan, S. V. CO2 sequestration by enzyme immobilized onto bioinspired silica. Chemical Communications 2013, 49, 3191-3193.

Fowler, C. E.; Shenton, W.; Stubbs, G.; Mann, S. Tobacco mosaic virus liquid crystals as templates for the interior design of silica mesophases and nanoparticles. Advanced Materials 2001, 13, 1266-1269.

Ge, J.; Lei, J. D.; Zare, R. N. Protein-inorganic hybrid nanoflowers. Nature Nanotechnology 2012, 7, 428-432.

Gerngross, T. U. Advances in the production of human therapeutic proteins in yeasts and filamentous fungi. Nature Biotechnology 2004, 22 (11), 1409-1414.

Goltner, C. G.; Antonietti, M. Mesoporous materials by templating of liquid crystalline phases. Advanced Materials 1997, 9, 431-&.

Gu, L.; Lajoie, C.; Kelly, C. Expression of a *Phanerochaete chrysosporium* manganese peroxidase gene in the yeast *Pichia pastoris*. Biotechnology Progress 2003, 19 (5), 1403-1409.

Han, M., Kickhoefer, V. A., Nemerow, G. R., Rome, L. H., 2011. Targeted vault nanoparticles engineered with an endosomolytic peptide deliver biomolecules to the cytoplasm. ACS Nano 5, 6128-6137.

Heijnen, I. A. F. M.; vanVugt, M. J.; Fanger, N. A.; Graziano, R. F.; deWit, T. P. M.; Hofhuis, F. M. A.; Guyre, P. M.; Capel, P. J. A.; Verbeek, J. S.; vandeWinkel, J. G. J. Antigen Targeting to Myeloid-Specific Human Fc Gamma RI/CD64 Triggers Enhanced Antibody Responses in Transgenic Mice. Journal of Clinical Investigation 1996, 97 (2), 331-338.

Henley, J. P., Sadana, A., 1984. Series-type enzyme deactivations: influence of intermediate activity on deactivation kinetics. Enzyme Microb. Technol. 6 (1), 35-41.

Henley, J. P., Sadana, A., 1985. Categorization of enzyme deactivations using a series-type mechanism. Enzyme Microb. Technol. 7 (2), 50-60.

Hirano, T., Honda, Y., Watanabe, T., Kuwahara, M., 2000. Degradation of bisphenol A by the lignin-degrading enzyme, manganese peroxidase, produced by the white-rot basidiomycete, *Pleurotus ostreatus*. Biosci., Biotechnol., Biochem. 64 (9), 1958-1962.

Ifere, G. O.; He, Q.; Igietseme, J. U.; Ananaba, G. A.; Lyn, D.; Lubitz, W.; Kellar, K. L.; Black, C. M.; Eko, F. O. Immunogenicity and Protection Against Genital *Chlamydia* Infection and Its Complications by a Multisubunit Candidate Vaccine. Journal of Microbiology, Immunology and Infection 2007, 40 (3), 188-200.

Jo, B. H.; Seo, J. H.; Yang, Y. J.; Baek, K.; Choi, Y. S.; Pack, S. P.; Oh, S. H.; Cha, H. J. Bioinspired Silica Nanocomposite with Autoencapsulated Carbonic Anhydrase as a Robust Biocatalyst for CO2 Sequestration. Acs Catalysis 2014, 4, 4332-4340.

Kalantari, M.; Yu, M. H.; Yang, Y. N.; Strounina, E.; Gu, Z. Y.; Huang, X. D.; Zhang, J.; Song, H.; Yu, C. Z. Tailoring mesoporous-silica nanoparticles for robust immobilization of lipase and biocatalysis. Nano Research 2017, 10, 605-617.

Kar, U. K.; Srivastava, M. K.; Andersson, A.; Baratelli, F.; Huang, M.; Kickhoefer, V. A.; Dubinett, S. M.; Rome, L. H.; Sharma, S. Novel CCL21-vault nanocapsule intratumoral delivery inhibits lung cancer growth. PLoS ONE 2011, 6 (5), e18758.

Kedersha, N. L.; Heuser, J. E.; Chugani, D. C.; Rome, L. H. Vaults. III. Vault Ribonucleoprotein Particles Open into Flower-Like Structures with Octagonal Symmetry. Journal of Cell Biology 1991, 112, 225-235.

Kedersha, N. L., Rome, L. H., 1986. Isolation and characterization of a novel ribonucleoprotein particle: large structures contain a single species of small RNA. J. Cell Biol. 103 (3), 699-709.

Kelly, K. A.; Robinson, E. A.; Rank, R. G. Initial Route of Antigen Administration Alters the T-Cell Cytokine Profile Produced in Response to the Mouse Pneumonitis Biovar of *Chlamydia trachomatis* following Genital Infection. Infection and Immunity 1996, 64 (12), 4976-83.

Kickhoefer, V. A.; Garcia, Y.; Mikyas, Y.; Johansson, E.; Zhou, J. C.; Raval-Fernandes, S.; Minoofar, P.; Zink, J. I.; Dunn, B.; Stewart, P. L.; Rome, L. H. Engineering of Vault Nanocapsules with Enzymatic and Fluorescent Properties. Proceedings of the National Academy of Sciences of the United States of America 2005, 102, 4348-4352.

Kickhoefer, V. A.; Liu, Y.; Kong, L. B.; Snow, B. E.; Stewart, P. L.; Harrington, L.; Rome, L. H. The telomerase/vault-associated protein TEP1 is required for vault RNA stability and its association with the vault particle. Journal of Cell Biology 2001, 152, 157-164.

Kickhoefer, V. A.; Siva, A. C.; Kedersha, N. L.; Inman, E. M.; Ruland, C.; Streuli, M.; Rome, L. H. The 193-kD vault protein, VPARP, is a novel poly(ADP-ribose) polymerase. Journal of Cell Biology 1999, 146, 917-928.

Kickhoefer, V. A., Han, M., Raval-Fernandes, S., Poderycki, M. J., Moniz, R. J., Vaccari, D., Silvestry, M., Stewart, P. L., Kelly, K. A., Rome, L. H., 2009. Targeting vault nanoparticles to specific cell surface receptors. ACS Nano 3 (1), 27-36.

Kickhoefer, V. A., Searles, R. P., Kedersha, N. L., Garber, M. E., Johnson, D. L., Rome, L. H., 1993. Vault ribonucleoprotein particles from rat and bullfrog contain a related small RNA that is transcribed by RNA polymerase III. J. Biol. Chem. 268 (11), 7868-7873.

Kickhoefer, V. A., Stephen, A. G., Harrington, L., Robinson, M. O., Rome, L. H., 1999b. Vaults and telomerase share a common subunit, TEP1. J. Biol. Chem. 274 (46), 32712-32717.

Kim, J.; Grate, J. W. Single-enzyme nanoparticles armored by a nanometer-scale organic/inorganic network. Nano Letters 2003, 3, 1219-1222.

Kong, L. B., Siva, A. C., Rome, L. H., Stewart, P. L., 1999. Structure of the vault, a ubiquitous celular component. Structure 7 (4), 371-379.

Kopeina, G. S., Afonina, Z. A., Gromova, K. V., Shirokov, V. A., Vasiliev, V. D., Spirin, A. S., 2008. Step-wise formation of eukaryotic double-row polyribosomes and circular translation of polysomal mRNA. Nucleic Acids Res. 36 (8), 2476-2488.

Kroger, N.; Deutzmann, R.; Sumper, M. Polycationic peptides from diatom biosilica that direct silica nanosphere formation. Science 1999, 286, 1129-1132.

Lai, C. Y.; Wiethoff, C. M.; Kickhoefer, V. A.; Rome, L. H.; Nemerow, G. R. Vault nanoparticles containing an adenovirus-derived membrane lytic protein facilitate toxin and gene transfer. ACS Nano 2009, 3 (3), 691-9.

Li, H. J.; Sethuraman, N.; Stadheim, T. A.; Zha, D. X.; Prinz, B.; Ballew, N.; Bobrowicz, P.; Choi, B. K.; Cook, W. J.; Cukan, M.; Houston-Cummings, N. R.; Davidson, R.; Gong, B.; Hamilton, S. R.; Hoopes, J. P.; Jiang, Y. W.; Kim, N.; Mansfield, R.; Nett, J. H.; Rios, S.; Strawbridge, R.; Wildt, S.; Gerngross, T. U. Optimization of humanized IgGs in glycoengineered *Pichia pastoris*. Nature Biotechnology 2006, 24 (2), 210-215.

Li, W.; Liu, J.; Zhao, D. Y. Mesoporous materials for energy conversion and storage devices. Nature Reviews Materials 2016, 1.

Liu, B.; Cao, Y. Y.; Huang, Z. H.; Duan, Y. Y.; Che, S. N. Silica Biomineralization via the Self-Assembly of Helical Biomolecules. Advanced Materials 2015, 27, 479-497.

Luckarift, H. R.; Dickerson, M. B.; Sandhage, K. H.; Spain, J. C. Rapid, room-temperature synthesis of antibacterial bionanocomposites of lysozyme with amorphous silica or titania. Small 2006, 2, 640-643.

Luckarift, H. R.; Spain, J. C.; Naik, R. R.; Stone, M. O. Enzyme immobilization in a biomimetic silica support. Nature Biotechnology 2004, 22, 211-213.

Luo, T. J. M.; Soong, R.; Lan, E.; Dunn, B.; Montemagno, C. Photo-induced proton gradients and ATP biosynthesis produced by vesicles encapsulated in a silica matrix. Nature Materials 2005, 4, 220-224.

Mahendra, S. (2017). Molecular Engineered Enzyme Catalysts for Biodegradation of Water Contaminants. Water Environment and Reuse Foundation Paul L. Busch Award Lecture, Water Environment Federation Technical Exhibition and Conference, Chicago, IL.

Mao, C. B.; Wang, F. K.; Cao, B. R. Controlling Nanostructures of Mesoporous Silica Fibers by Supramolecular Assembly of Genetically Modifiable Bacteriophages. Angewandte Chemie-International Edition 2012, 51, 6411-6415.

Marcus, L., Ris, H., Halvorson, H., Bretthauer, R., Bock, R., 1967. Occurrence, isolation, and characterization of polyribosomes in yeast. J. Cell Biol. 34 (2), 505-512.

Mikyas, Y.; Makabi, M.; Raval-Fernandes, S.; Harrington, L.; Kickhoefer, V. A.; Rome, L. H.; Stewart, P. L. Cryoelectron Microscopy Imaging of Recombinant and Tissue Derived Vaults: Localization of the MVP N Termini and VPARP. Journal of Molecular Biology 2004, 344 (1), 91-105.

Moore, T.; Ekworomadu, C. O.; Eko, F. O.; MacMillan, L.; Ramey, K.; Ananaba, G. A.; Patrickson, J. W.; Nagappan, P. R.; Lyn, D.; Black, C. M.; Igietseme, J. U. Fc Receptor-Mediated Antibody Regulation of T cell Immunity Against Intracellular Pathogens. Journal of Infectious Diseases 2003, 188 (4), 617-624.

Mrazek, J., Toso, D., Ryazantsev, S., Zhang, X., Zhou, Z. H., Fernandez, B. C., Kickhoefer, V. A., Rome, L. H., 2014. Polyribosomes are molecular 3D nanoprinters that orchestrate the assembly of vault particles. ACS Nano 8 (11), 11552-11559.

Pal, S.; Peterson, E. M.; de la Maza, L. M. Vaccination with the *Chlamydia trachomatis* Major Outer Membrane Protein Can Elicit an Immune Response as Protective as That Resulting from Inoculation with Live Bacteria. Infection and Immunity 2005, 73 (12), 8153-8160.

Pieters, B. J. G. E.; van Eldijk, M. B.; Nolte, R. J. M.; Mecinovic, J. Natural supramolecular protein assemblies. Chemical Society Reviews 2016, 45, 24-39.

Pouget, E.; Dujardin, E.; Cavalier, A.; Moreac, A.; Valery, C.; Marchi-Artzner, V.; Weiss, T.; Renault, A.; Paternostre, M.; Artzner, F. Hierarchical architectures by synergy between dynamical template self-assembly and biomineralization. Nature Materials 2007, 6, 434-439.

Rome, L. H.; Kickhoefer, V. A. Development of the Vault Particle as a Platform Technology. ACS Nano 2013, 7 (2), 889-902.

Sharma, S.; Stolina, M.; Luo, J.; Strieter, R. M.; Burdick, M.; Zhu, L. X.; Batra, R. K.; Dubinett, S. M. Secondary Lymphoid Tissue Chemokine Mediates T cell-Dependent Antitumor Responses in vivo. Journal of Immunology 2000, 164 (9), 4558-4563.

Shieh, F. K.; Wang, S. C.; Yen, C. I.; Wu, C. C.; Dutta, S.; Chou, L. Y.; Morabito, J. V.; Hu, P.; Hsu, M. H.; Wu, K. C. W.; Tsung, C. K. Imparting Functionality to Biocatalysts via Embedding Enzymes into Nanoporous Materials by a de Novo Approach: Size-Selective Sheltering of Catalase in Metal-Organic Framework Microcrystals. Journal of the American Chemical Society 2015, 137, 4276-4279.

Shimizu, K.; Cha, J.; Stucky, G. D.; Morse, D. E. Silicatein alpha: Cathepsin L-like protein in sponge biosilica. Proceedings of the National Academy of Sciences of the United States of America 1998, 95, 6234-6238.

Spadaro, J. T., Renganathan, V., 1994. Peroxidase-catalyzed oxidation of azo dyes: mechanism of Disperse Yellow 3 degradation. Arch. Biochem. Biophys. 312 (1), 301-307.

Stephen, A. G., Raval-Fernandes, S., Huynh, T., Tones, M., Kickhoefer, V. A., Rome, L. H., 2001. Assembly of vault-like particles in insect cells expressing only the major vault protein. J. Biol. Chem. 276 (26), 23217-23220.

Sun, J. R.; Coughlin, P.; Salem, H. H.; Bird, P. Production and Characterization of Recombinant Human Proteinase-Inhibitor-6 Expressed in *Pichia-pastoris*. Biochimica Et Biophysica Acta-Protein Structure and Molecular Enzymology 1995, 1252 (1), 28-34.

Tanaka, H.; Kato, K.; Yamashita, E.; Sumizawa, T.; Zhou, Y.; Yao, M.; Iwasaki, K.; Yoshimura, M.; Tsukihara, T. The Structure of Rat Liver Vault at 3.5 Angstrom Resolution. Science 2009, 323, 384-388.

Tanev, P. T.; Pinnavaia, T. J. A Neutral Templating Route to Mesoporous Molecular-Sieves. Science 1995, 267, 865-867.

Tarn, D.; Ashley, C. E.; Xue, M.; Carnes, E. C.; Zink, J. I.; Brinker, C. J. Mesoporous Silica Nanoparticle Nanocarriers: Biofunctionality and Biocompatibility. Accounts of Chemical Research 2013, 46, 792-801.

Tien, M., Kirk, T. K., 1988. Lignin peroxidase of *Phanerochaete chrysosporium*. Methods Enzymol. 161, 238-249.

Wang, J.-H., Hung, W., Tsai, S.-H., 2011. High efficiency transformation by electroporation of *Yarrowia lipolytica*. J. Microbiol. 49, 469-472.

Wang, M., Abad, D., Kickhoefer, V. A., Rome, L. H., Mahendra, S., 2015. Vault nanoparticles packaged with enzymes as an efficient pollutant biodegradation technology. ACS Nano 9 (11), 10931-10940.

Wang, M., Y. Chen, D. Abad, V. A. Kickhoefer, P. Allard, L. H. Rome, and S. Mahendra (2017). Vault Nanoparticles for Water Treatment Applications: Experimental and Educational Approaches. Sixth Sustainable Nanotechnology Organization Conference, Los Angeles, CA.

Wang, S. J.; Ge, X.; Xue, J. Y.; Fan, H. M.; Mu, L. J.; Li, Y. P.; Xu, H.; Lu, J. R. Mechanistic Processes Underlying Biomimetic Synthesis of Silica Nanotubes from Self-Assembled Ultrashort Peptide Templates. Chemistry of Materials 2011, 23, 2466-2474.

Waterham, H. R., Digan, M. E., Koutz, P. J., Lair, S. V., Cregg, J. M., 1997. Isolation of the *Pichia pastoris* glyceraldehyde-3-phosphate dehydrogenase gene and regulation and use of its promoter. Gene 186, 37-44.

Yan, M.; Ge, J.; Liu, Z.; Ouyang, P. K. Encapsulation of single enzyme in nanogel with enhanced biocatalytic activity and stability. Journal of the American Chemical Society 2006, 128, 11008-11009.

Yang, S. C.; Batra, R. K.; Hillinger, S.; Reckamp, K. L.; Strieter, R. M.; Dubinett, S. M.; Sharma, S. Intrapulmonary Administration of CCL21 Gene-Modified Dendritic Cells Reduces Tumor Burden in Spontaneous Murine Bronchoalveolar Cell Carcinoma. Cancer research 2006, 66 (6), 3205-13.

Yang, S. C.; Hillinger, S.; Riedl, K.; Zhang, L.; Zhu, L.; Huang, M.; Atianzar, K.; Kuo, B. Y.; Gardner, B.; Batra, R. K.; Strieter, R. M.; Dubinett, S. M.; Sharma, S. Intratumoral Administration of Dendritic Cells Overexpressing CCL21 Generates Systemic Antitumor Responses and Confers Tumor Immunity. Clinical Cancer Research 2004, 10 (8), 2891-901.

All scientific and technical terms used in this application have meanings commonly used in the art unless otherwise specified.

As used herein, the terms "subject", "patient", and "individual" are used interchangeably to refer to humans and non-human animals. The term "non-human animal" includes all vertebrates, e.g., mammals and non-mammals, such as non-human primates, horses, sheep, dogs, cows, pigs, chickens, and other veterinary subjects and test animals. In some embodiments of the present invention, the subject is a mammal. In some embodiments of the present invention, the subject is a human.

The use of the singular can include the plural unless specifically stated otherwise. As used in the specification and the appended claims, the singular forms "a", "an", and "the" can include plural referents unless the context clearly dictates otherwise. As used herein, "and/or" means "and" or "or". For example, "A and/or B" means "A, B, or both A and B" and "A, B, C, and/or D" means "A, B, C, D, or a combination thereof" and said "combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

The phrase "comprises, consists essentially of, or consists of" is used as a tool to avoid excess page and translation fees and means that in some embodiments the given thing at issue comprises something, and in some embodiments the given thing at issue consists of something. For example, the sentence "In some embodiments, the composition comprises, consists essentially of, or consists of A" is to be interpreted as if written as the following two separate sentences: "In some embodiments, the composition comprises A. In some embodiments, the composition consists essentially of A. In some embodiments, the composition consists of A." Similarly, a sentence reciting a string of alternates is to be interpreted as if a string of sentences were provided such that each given alternate was provided in a sentence by itself. For example, the sentence "In some embodiments, the composition comprises A, B, or C" is to be interpreted as if written as the following three separate sentences: "In some embodiments, the composition comprises A. In some embodiments, the composition comprises B. In some embodiments, the composition comprises C."

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A method of counteracting, degrading, or inactivating a bisphenol in a material, which comprises
making sol-gel vaults by precipitating silica sol-gel particles on vault particles having manganese peroxidase packaged within their interior cavities by contacting the vault particles with a mixture of pre-hydrolyzed tetramethyl orthosilicate having a pH of 5.5 to 6.5 for about 30 minutes or more; and
contacting the material with the sol-gel vaults.

2. The method according to claim 1, wherein the pH is 5.5 to 6.0.

3. The method according to claim 2, wherein the amount of the pre-hydrolyzed tetramethyl orthosilicate is in excess of the amount of vault particles.

4. The method according to claim 2, further comprising adding the manganese peroxidase to the mixture.

* * * * *